(12) United States Patent
Choi et al.

(10) Patent No.: US 12,127,079 B2
(45) Date of Patent: Oct. 22, 2024

(54) METHOD AND SYSTEM FOR PROVIDING COMMUNITY SERVICE USING SHORT-RANGE BROADCASTING

(71) Applicant: HWACOM CO., LTD., Seoul (KR)

(72) Inventors: Jung In Choi, Anyang-si (KR); Seok Ki Kim, Seoul (KR)

(73) Assignee: HWACOM CO., LTD., Seoul (KR)

( * ) Notice: Subject to any disclaimer, the term of this patent is extended or adjusted under 35 U.S.C. 154(b) by 578 days.

(21) Appl. No.: 17/430,306

(22) PCT Filed: Sep. 4, 2020

(86) PCT No.: PCT/KR2020/011911
§ 371 (c)(1),
(2) Date: Aug. 11, 2021

(87) PCT Pub. No.: WO2021/125499
PCT Pub. Date: Jun. 24, 2021

(65) Prior Publication Data
US 2022/0132276 A1    Apr. 28, 2022

(30) Foreign Application Priority Data

Dec. 16, 2019   (KR) .................. 10-2019-0167705
Apr. 13, 2020   (KR) .................. 10-2020-0044585

(51) Int. Cl.
*H04W 4/06*    (2009.01)
*H04W 4/21*    (2018.01)
(Continued)

(52) U.S. Cl.
CPC ............. *H04W 4/06* (2013.01); *H04W 4/21* (2018.02); *H04W 4/50* (2018.02); *H04W 4/80* (2018.02)

(58) Field of Classification Search
CPC ........... H04W 4/80; H04W 4/06; H04W 4/08; H04W 8/005; H04W 84/20; H04W 4/12; H04W 4/21; H04W 4/33; H04W 84/18
See application file for complete search history.

(56) References Cited

U.S. PATENT DOCUMENTS

2015/0372965 A1*  12/2015  Seon .................... H04L 51/046
                                                               715/758
2016/0157048 A1    6/2016  Kerai et al.
(Continued)

FOREIGN PATENT DOCUMENTS

KR    20030021771 A    3/2003
KR    20030024018 A    3/2003
(Continued)

OTHER PUBLICATIONS

International Search Report of PCT/KR2020/011911, Dec. 15, 2020.
The extended European search report of EP 20 90 3795, Nov. 21, 2023.

*Primary Examiner* — Nam T Huynh
(74) *Attorney, Agent, or Firm* — STIP Law Group, LLC

(57) ABSTRACT

The present invention relates to a method and system for providing a community service by utilizing short-range broadcasting, and specifically, to a community service providing method and a system for the same, which allow devices to broadcast arbitrary packets using a Bluetooth network, and allow devices receiving the packets to use the community service through a wide area network.

6 Claims, 25 Drawing Sheets

(51) Int. Cl.
    *H04W 4/50*    (2018.01)
    *H04W 4/80*    (2018.01)

(56) References Cited

U.S. PATENT DOCUMENTS

2017/0280298 A1* 9/2017 Mycek ................. H04W 4/023
2018/0352415 A1 12/2018 Ma et al.

FOREIGN PATENT DOCUMENTS

| | | |
|---|---|---|
| KR | 100706985 B1 | 4/2007 |
| KR | 101070709 B1 | 10/2011 |
| KR | 20140050537 A | 4/2014 |
| KR | 20140128039 A | 11/2014 |
| KR | 101654261 B1 | 9/2016 |
| KR | 20170004107 A | 1/2017 |
| KR | 101728115 B1 | 4/2017 |
| KR | 20180004185 A | 1/2018 |
| KR | 20180041801 A | 4/2018 |
| KR | 20180109524 A | 10/2018 |
| KR | 102138647 B1 | 7/2020 |
| WO | WO-2016149473 A1 * | 9/2016 ............. H04W 4/08 |

* cited by examiner (a)

(b)

METHOD AND SYSTEM FOR PROVIDING COMMUNITY SERVICE USING SHORT-RANGE BROADCASTING

CROSS-REFERENCE TO RELATED APPLICATIONS

This application is the U.S. National Phase under 35 U.S.C. § 371 of International Application No. PCT/KR2020/011911 filed on Sep. 4, 2020, which in turn claims the benefit of Korean Applications No. 10-2019-0167705 filed on Dec. 16, 2019 and No. 10-2020-0044585 filed on Apr. 13, 2020, the disclosures of which are incorporated by reference into the present application.

TECHNICAL FIELD

The present invention relates to a method and system for providing a community service by utilizing short-range broadcasting, and specifically, to a community service providing method and a system for the same, which allow devices to broadcast arbitrary packets using a Bluetooth network, and allow devices receiving the packets to use the community service through a wide area network. In addition, the present invention relates to a service providing method, which allows users in one offline place to easily form an online community, if it is verified through a short-range network such as Bluetooth that a plurality of neighboring devices exists within a short distance from an arbitrary host device, by allowing these devices to belong to one online community, i.e., a chat room, very easily.

BACKGROUND ART

With development of networks in the 2000s, online community services using a network, for example, a messenger, a chatting service, an SNS service and the like, also have been developed greatly until recently. In this process, improvement of terminals used by users, as well as development of the network, has also contributed greatly, and development of networks and terminals has contributed to generation of various types of online community services. Meanwhile, although the online community services as described above have been developed continuously, the online community services face a limit caused by the fact that the origin of the services is still based on pure online. In addition, as there is a limit in exchanging information among members through online, it is required to pass through a procedure of which security is corrected to a predetermined level (e.g., a procedure of sharing information for identifying members from each other, such as an ID, a phone number or the like) in order for social interactions, and there has been a problem or inconvenience in that there is still a large barrier to interactions with various many unspecified people.

On the other hand, there are many inconveniences in performing offline community activities, like the limitations of the online community services described above, and for example, in the case of a club activity, an assembly meeting or the like where many unspecified people gather and do an activity together, there is an inconvenience of going through a troublesome procedure of exchanging business cards or phone numbers with each other at the beginning to form a new offline community among them. For example, when it is assumed that ten people are gathered in a specific offline meeting, $_{10}C_2=10!/2!8!=45$ times of information exchange activities will be required to exchange information with each other, and as the number of gathered people increases, the information exchange activity will increase rapidly, and thus it is not easy for the many unspecified people to form a new offline community in an offline space.

The present invention is based on a result of pondering over how to construct many unspecified communities with ease in view of the limitation in online community services as described above and the problem of forming offline communities, and specifically, the present invention relates to a method and system for providing a community service, which allows broadcasting of packets for encouraging users to participate in an offline meeting formed in the same space through a short-range communication network, more accurately, a Bluetooth network or a Bluetooth mesh network, and shares information online with each other based on a result thereof.

The present invention has been derived in view of these problems and invented to provide additional technical elements that can solve the problems described above and cannot be easily invented by those skilled in the art.

DISCLOSURE

Technical Problem

Therefore, the present invention has been made in view of the above problems, and it is an object of the present invention to allow users within a short distance from each other to establish an online community in a simple way, and particularly, allow many unspecified users meeting offline at this point to use the same community service through advertisement packets (hereinafter, referred to as ad packets) broadcast through a Bluetooth mesh network. In another aspect, an object of the present invention is to allow many unspecified users meeting in an offline space to have social interactions in an online community, while keeping the purpose of the offline meeting, by verifying through a Bluetooth mesh network that the users are within a short distance from each other.

In addition, another object of the present invention is to provide a stable environment for data transmission and reception, i.e., a community environment of high quality, by propagating information on the community service through a Bluetooth network when the ad packets are broadcast among users within a short distance, and using a wide area network such as a mobile communication network or Wi-Fi when the users actually participate in a community.

In addition, another object of the present invention is to provide differentiated services to guest devices that have accessed a host device recently, by inserting a direct field, i.e., a value for identifying whether the ad packet is received from the host device, in the ad packet propagated among the devices.

In addition, another object of the present invention is to make it possible to adjust the number of participants in a community, by further inserting a counting value for controlling a range of participants in the ad packet.

In addition, another object of the present invention is to minimize waste of network resources or waste of power consumption of transmission and reception devices when ad packets are broadcast, by forbidding guest devices receiving the ad packets from broadcasting for a predetermined period of time or allowing the guest devices to broadcast the ad packets to other devices only for a predetermined period of time.

In addition, another object of the present invention is to allow a host of a community to continuously invite other users participating in an offline meeting to the community to invigorate the community, by allowing an arbitrary device to be designated as the host and allowing the host to continuously search for neighboring devices capable of short-range communication.

In addition, another object of the present invention is to allow a host to periodically search for users who have left the offline meeting, i.e., users who are no longer able to perform short-range communicate with the host, so that information on the users may be displayed in the community to make it easy to grasp the state of participants.

In addition, another object of the present invention is to allow a user to continuously participate in an online community, although the user belonging to a community leaves an offline meeting, so that social interactions in the community may be continued.

Meanwhile, the technical problems of the present invention are not limited to the technical problems mentioned above, and other technical problems not mentioned will be clearly understood by those skilled in the art from the following description.

Technical Solution

To accomplish the above objects, according to one aspect of the present invention, there is provided a method of allowing a device to execute a community service using short-range broadcasting, the method comprising the steps of: allowing the device to transfer a community establishment request to a service server according to an input inputted from a user of the device; allowing the device to receive community information from the service server; allowing the device to generate an ad packet with reference to the community information; and allowing the device to broadcast the ad packet.

In addition, in the method described above, the ad packet may include a UUID for identifying the community service, a community identifier for identifying a community established by the service server, and a counting value (TTL) for controlling a range of devices to be allowed to participate in the community.

In addition, the ad packet may further include a direct field for identifying whether the ad packet is received directly from a host device, wherein the direct field of the ad packet broadcast from the device may have a true value.

In addition, the method may further comprise the step of allowing the device to delegate authority capable of broadcasting ad packets to other devices.

According to another aspect of the present invention, there is provided a method of allowing a device to execute a community service using short-range broadcasting, the method comprising the steps of: allowing the device to receive a first ad packet from a first external device; allowing the device to generate a second ad packet with reference to information included in the received first ad packet; and allowing the device to broadcast the second ad packet.

In addition, in the method described above, the first ad packet or the second ad packet may include a UUID for identifying the community service, a community identifier for identifying a community established by the service server, and a counting value (TTL) for controlling a range of devices to be allowed to participate in the community.

In addition, the method may further comprise the step of allowing the device to transmit a community participation request to the service server with reference to the UUID and the community identifier included in the received first ad packet.

In addition, in the method described above, the first ad packet may further include a direct field for identifying whether or not the device receives the ad packet directly from a host device, wherein when the direct field has a true value, a second ad packet is generated by changing the direct field to a false value.

In addition, the method described above may further comprise, after the step of allowing to broadcast the second ad packet, the step of stopping reception of ad packets from other devices or broadcast of ad packets to other devices for a predetermined time.

In addition, the method described above may further comprise, after the step of allowing to receive a first ad packet, the step of allowing reception of ad packets from other devices or broadcast of ad packets to other devices for a predetermined time.

Advantageous Effects

According to the present invention, there is an effect of establishing an online community on the spot among the users within a short distance from each other, and maintaining the community even after the meeting is over.

In addition, according to the present invention, there is an effect of allowing users to stably conduct interaction activities by utilizing short-range communication (Bluetooth mesh network), which shows an unstable communication state as the use amount increases, only for the purpose of verifying existence of a short distance among the users, and utilizing a stable wide area network such as a mobile communication network, Wi-Fi or the like for actually providing an online community.

In addition, according to the present invention, there is an effect of greatly reducing power consumption of terminals that transmit ad packets, by broadcasting ad packets for encouraging users to participate in a community.

In addition, according to the present invention, there is an effect of distinguishing a device closest to a host device by utilizing various values included in the ad packet, and an effect of providing additional services to the device closest to the host device by utilizing this information.

In addition, according to the present invention, there is an effect of adjusting a range of community participants or a broadcasting range by including a counting value in the ad packet.

In addition, according to the present invention, there is an effect of minimizing waste of resources when ad packets are broadcast, by forbidding guest devices receiving the ad packets from broadcasting ad packets for a predetermined period of time or allowing the guest devices to broadcast ad packets to other devices only for a predetermined period of time.

In addition, according to the present invention, although a meeting has begun in an offline space, troublesome activities of exchanging information with each other may be omitted by establishing and utilizing an online community, and rather it may be helpful for the users to facilitate social interactions by allowing the users to exchange information with each other very quickly.

In addition, according to the present invention, there is an effect of allowing users to consistently continue social interactions by allowing the users to perform community activities in an online space through a wide area network even after an offline meeting is over.

Meanwhile, the effects of the present invention are not limited to those mentioned above, and other technical effects not mentioned will be clearly understood by those skilled in the art from the following description.

DESCRIPTION OF SYMBOLS

Figure 1:
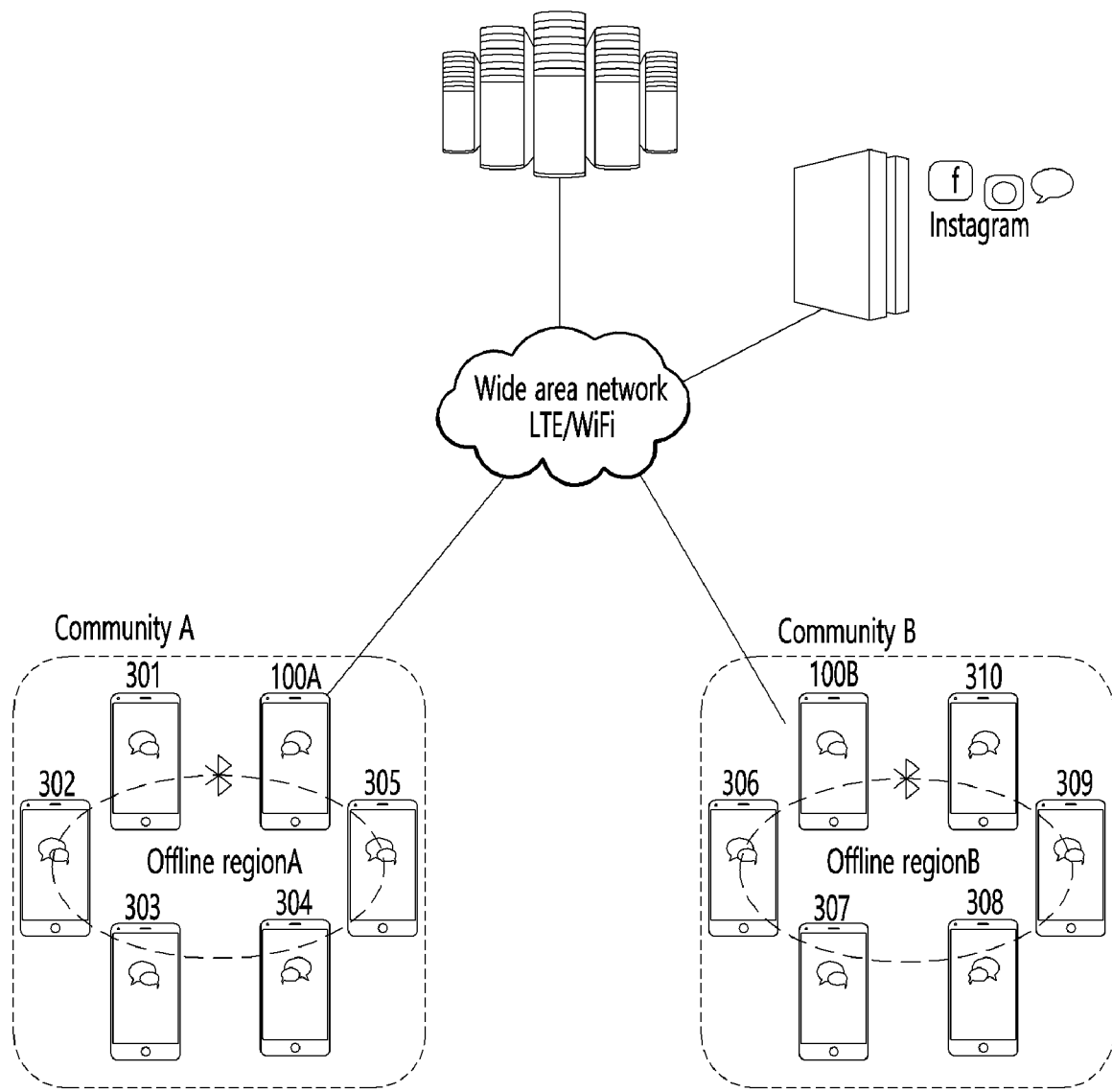
FIG. 1 is a view systemically showing a basic environment in which a community service according to the present invention is provided.

100, 101, 102, 103, 104, 105: Host device
200: Service server
301 to 310: Guest device
401, 402, 403: External device
500: Beacon device
600: Database
700: SNS server

MODE FOR INVENTION

The purpose and technical configuration of the present invention and the details of the effect according thereto will be more clearly understood by the following detailed description based on the drawings attached in the specification of the present invention. The embodiments according to the present invention will be described in detail with reference to the accompanying drawings.

The embodiments disclosed in this specification should not be interpreted or used as limiting the scope of the present invention. It is natural to those skilled in the art that the description including the embodiments of the present specification have various applications. Accordingly, arbitrary embodiments described in the detailed description of the present invention are exemplary to better describe the present invention and are not intended to limit the scope of the present invention to the embodiments.

The functional blocks shown in the drawings and described below are only examples of possible implementations. Other functional blocks may be used in other implementations without departing from the spirit and scope of the detailed description. Further, although one or more functional blocks of the present invention are expressed as individual blocks, one or more of the functional blocks of the present invention may be a combination of various hardware and software configurations that execute the same function.

In addition, an expression that includes certain components is an expression of an "open type" and simply refers to existence of the components, and should not be understood as excluding additional components.

Furthermore, when a component is referred to as being "connected" or "coupled" to another component, it should be understood that although the component may be directly connected or coupled to another component, yet another component may exist therebetween.

Hereinafter, the embodiments of the present invention will be described with reference to the drawings.

First, FIG. 1 shows a simplified system configured to understand the basic concept of a community service according to the present invention. According to FIG. 1, the entire system may include a plurality of devices 100A, 100B, and 301 to 310, and a service server 200 capable of providing a community service to the devices.

The present invention is to allow users within a short distance from each other in an offline space to create an online community that can be immediately used on the spot by using the devices they carry, e.g., smartphones, and in FIG. 1, this is shown as offline areas A and B and communities A and B including devices existing in the offline areas, respectively.

One of the most important features of the present invention is to broadcast a packet (ad packet) that induces participation in a community to other devices within a short distance from an arbitrary device, and to allow the devices receiving the packet to access a community provided by the service server 200 through a wide area network (mobile communication network, Wi-Fi, or the like).

Meanwhile, FIG. 1 shows a view of an SNS server 700, which is operated by an SNS company, connected to a wide area network, and the service server 200 according to the present invention may be implemented to encourage users to participate in a community or to share data or information through connection with the SNS server. That is, the so-called non-members who have not joined previously through the service server according to the present invention may use the service according to the present invention by using login information of other SNS services, and furthermore, it may be implemented such that the files shared through other SNS services may also be shared in each community through the service server.

Figure 2:
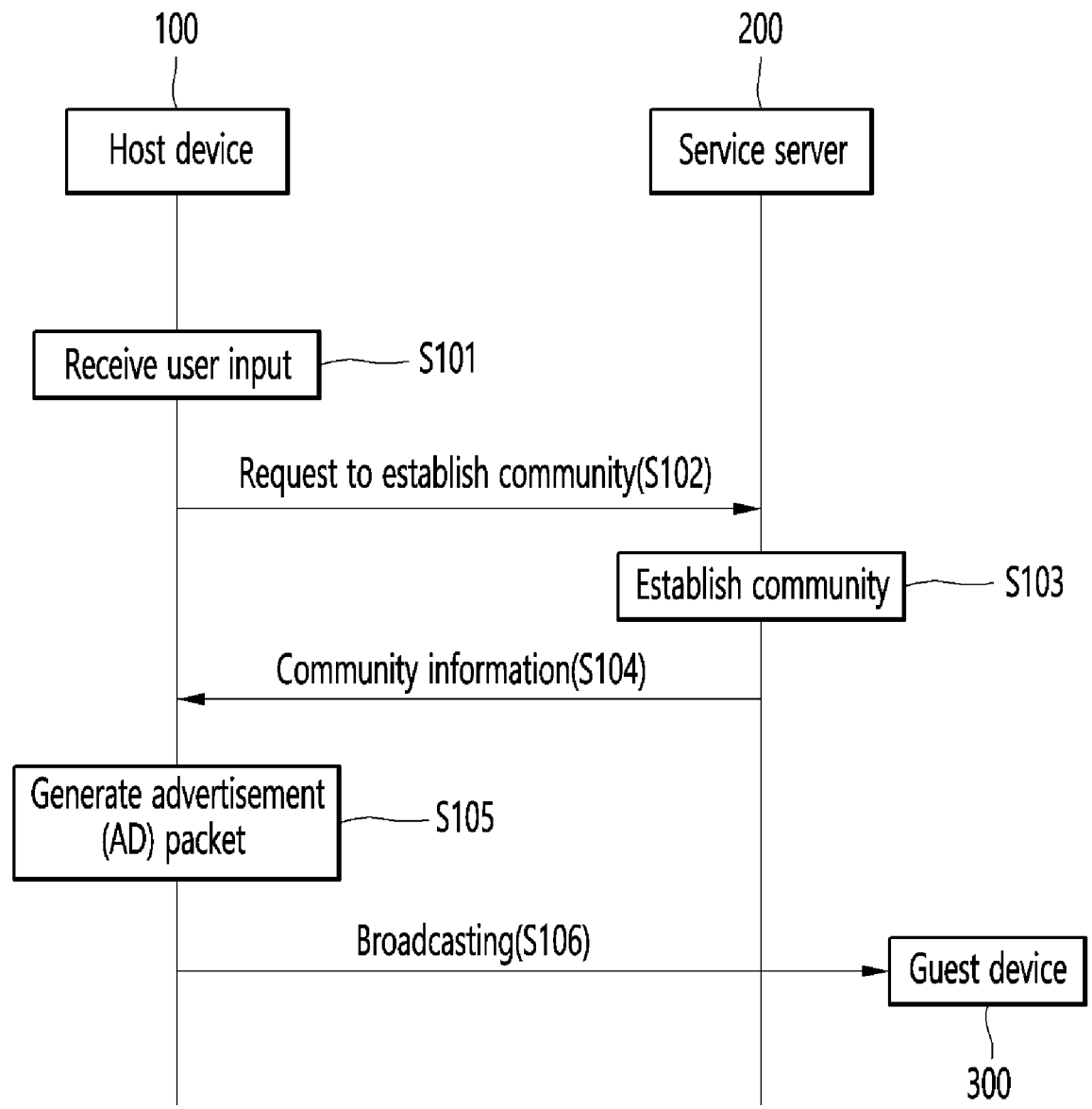
FIG. 2 is a view showing a first embodiment according to the present invention.

FIG. 2 illustrates a system according to a first embodiment of the present invention, and it shows a process in which a host device 100 initially requests the service server 200 to establish a community, and broadcasts an ad packet to encourage other users to participate in the established community.

Before describing in full scale, first, the devices and the service server mentioned in this detailed description may have the following hardware features.

First, in relation to the device (in this case, the device includes a host device and guest devices surrounding the host device), the device mentioned in the detailed description refers to an apparatus possessed or carried by a user, and this may include portable terminals such as smartphones, PDAs, and tablet PCs, as well as installation-type terminals such as home PCs or the like. Seeing the device from the aspect of an apparatus, it is assumed that each device has a central processing unit (CPU) and memory. The central processing unit may also be referred to as a controller, a microcontroller, a microprocessor, a microcomputer, or the like. In addition, the central processing unit may be implemented by hardware or firmware, software, or a combination these, and when the central processing unit is implemented using hardware, it may be configured as an application specific integrated circuit (ASIC) or a digital signal processor (DSP), a digital signal processing device (DSPD), a programmable logic device (PLD), or a field programmable gate array (FPGA), and when the central processing unit is implemented using firmware or software, the firmware or software may be configured to include a module, a procedure, a function or the like performing the functions or operations described above. In addition, the memory may be implemented as Read Only Memory (ROM), Random Access Memory (RAM), Erasable Programmable Read Only Memory (EPROM), Electrically Erasable Programmable Read-Only Memory (EEPROM), flash memory, Static RAM (SRAM), a hard disk drive (HDD), a solid state drive (SSD) or the like.

For reference, in this detailed description, it will be described assuming that the device is a smartphone or a tablet PC to help understanding of the present invention. In this case, the device may include a display and a touch-sensitive surface, and furthermore, one or more other physical user input means such as a physical keyboard, mouse and/or joystick may be further connected. In addition, the device may further include a means for sensing and recording sounds or voices. Meanwhile, various applications executed on the device may optionally use at least one universal physical user input means such as a touch-sensitive surface. One or more functions of the touch-sensitive surface and corresponding information displayed on the terminal may be optionally adjusted or changed from one application to a next application and/or within an individual application. In this way, the universal physical architecture of the device (such as the touch-sensitive surface) may optionally support a variety of applications using user interfaces that are intuitive and clear to users.

Meanwhile, the service server is a configuration for providing a program, i.e., a set of instructions, for actually implementing the method according to the present invention, and furthermore, corresponds to a configuration for processing or storing various kinds of data received from a plurality of terminals. The service server may be at least a server PC managed by a specific operator or may be a cloud server provided by another company, i.e., a cloud server that can be used by an operator after joining as a member. Particularly, when the service server is implemented as a server PC, the service server may include a central processing unit and memory, and as they are described above in detail in the description of the terminal, the description thereof will be omitted here.

The first embodiment of FIG. 2 shows a process of requesting the service server to establish a community by an arbitrary user by using his or her device, and receiving information on the community from the service server and broadcasting the information to other devices when the community is established in response to the request. As an easy example, it relates to a situation in which an arbitrary user attends an offline meeting and desires to establish an online community together with neighboring people by executing an application by himself or herself, and it shows a process of allowing many unspecified people in the neighborhood (in this case, the many unspecified people will be users of devices within a range capable of performing short-range communication) to participate in a chat room when the arbitrary user clicks a chat room opening icon of the application.

The first embodiment starts from, first of all, a step of directing the device 100, by an application installed in a device, to transmit a community establishment request to the service server 200 (S102) in response to reception of an input from a user (S101). For reference, the device that transmits a community establishment request to the service server 200 is referred to as a host device 100 in this detailed description to help understanding of the present invention. Meanwhile, the application mentioned above may be an installation file provided by the service server, or an installation file distributed or sold by the service server to each user through another server in an application market or the like. In addition, reception of an input from a user may be understood as a touch input or a keyboard input that is input by the user to establish a community after executing the application, and the input method is not limited to the those described above. In addition, the community establishment request transmitted to the service server may be preferably accomplished through a wide area network such as a mobile communication network or Wi-Fi. In addition, various information may be included in the community establishment request, and for example, it may further include basic information such as the time of requesting establishment of a community, the location at the time of requesting establishment of the community, or version information of the application, and additional information on the matters optionally set by the user such as the number of guests allowed to participate in, conditions of the guests, the title of the community, a community retention time and the like.

Meanwhile, after receiving the community establishment request from the device, the service server establishes an arbitrary community in response to the community establishment request (S103), and this may be actually implemented by establishing a chat room.

Next, the application installed in the host device 100 may receive information on the established community, i.e., community information, from the service server (S104), and at this point, the community information may include an identifier for identifying a community service, an identifier for identifying the established community, and other various kinds of information about the community (the time of requesting establishment of the community, the location at the time of requesting establishment of the community, the number of guests allowed to participate in, conditions of the guests, the title of the community, community retention time, and the like).

Next, the application installed in the host device 100 directs the host device 100 to generate an ad packet with reference to the previously received community information (S105). The ad packet may be understood as a data packet generated to propagate the community information to the outside, and at this point, the structure of the ad packet may be formed to include information as shown in FIG. 3.

Figure 3A:
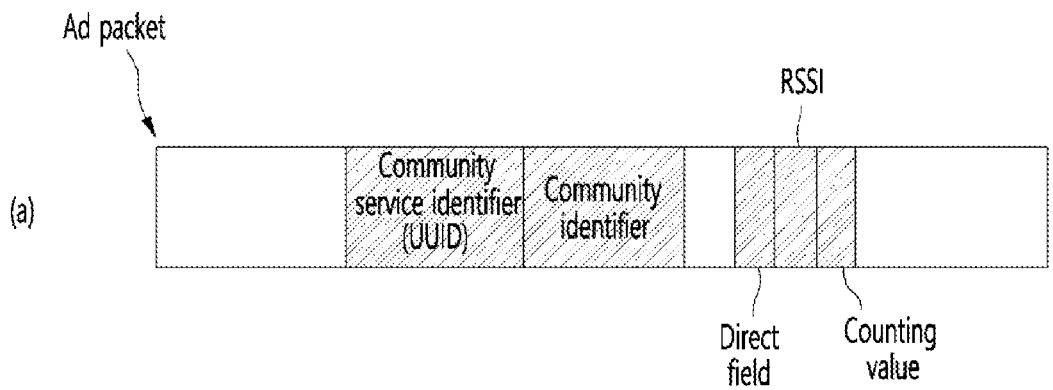
FIG. 3A, FIG. 3B and FIG. 3C are a view exemplarily showing the structure of an ad packet.
Figure 3B:
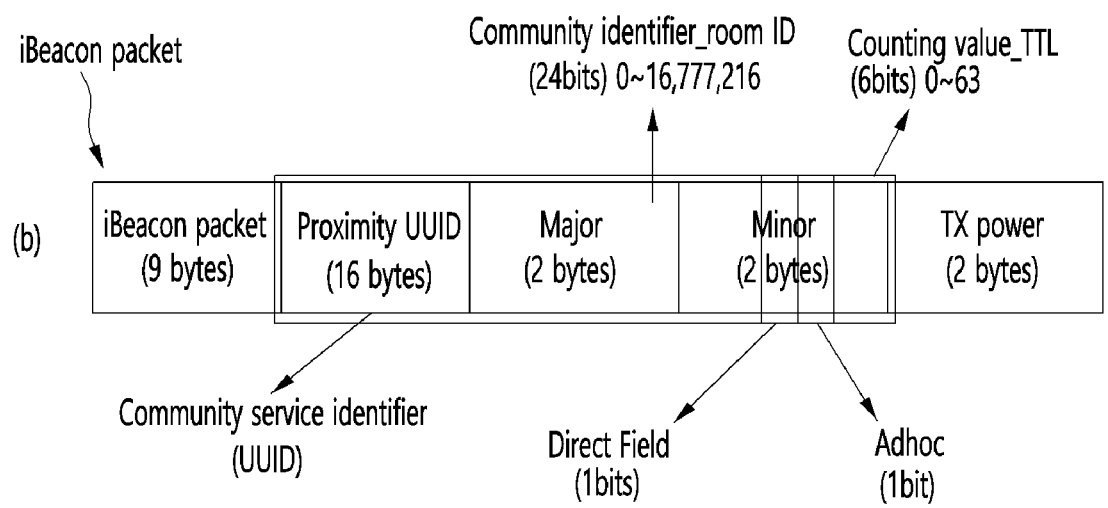
Figure 3C:
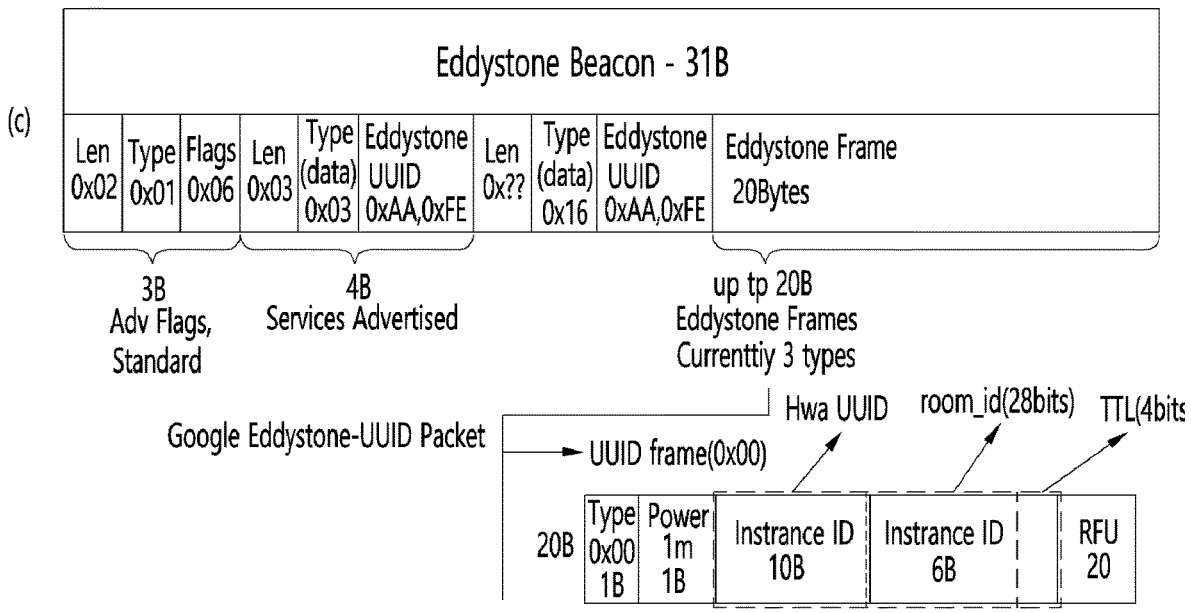

Referring to FIG. 3, the ad packet may basically include a UUID, which is an identifier for identifying a community service, and a community identifier for identifying the established community, and in addition, the ad packet may further include at least one among a counting value (TTL) for controlling the number of guests to be allowed to participate in the community, a direct field for identifying whether the ad packet is transmitted directly from the host device 100, and a Received Signal Strength Indication (RSSI) for indicating signal sensitivity between a transmitting device and a receiving device.

Specifically, in relation to the counting value, the counting value (TTL) is a value for limiting the number of guests, and when the counting value broadcast from the host device 100 is n, the devices receiving the counting value will reduce the counting value by 1 and broadcast the ad packet to other devices, and finally, when the counting value is 0, it may not be broadcast any more. Meanwhile, preferably, the counting value may have a highest value of 63.

In relation to the direct field, in the present invention, it is possible to continuously broadcast through a Bluetooth mesh network using the counting value. In some cases, it may need to confirm whether an arbitrary guest device, i.e., which node among arbitrary nodes, has received the ad packet directly from the host device 100. Although the direct field will be set to a true value in the ad packet transmitted from the host device 100, guest devices receiving the ad packet may broadcast the ad packet by changing the value of the direct field to false. In this case, since only the nodes receiving the ad packet directly from the host device 100 will have a true value in the direct field, it is possible to distinguish guest devices closest to the host device 100. In addition, as the devices receiving an ad packet in which the direct field is true may be estimated as being within a predetermined distance, for example, about 40 meters (this is a value that can be adjusted according to the intention of a designer) according to circumstances, various additional services or other additional information may be provided to the nearby devices.

In relation to the RSSI, the ad packet may include received signal strength indication (RSSI) information indicating received Bluetooth sensitivity (a degree of excellence of signal), and an approximate distance between the host device 100 and the guest device may be estimated through the RSSI. Preferably, distance estimation with reference to the RSSI may be implemented to be effective only when the guest device receives the ad packet directly from the host device 100, i.e., only when the direct field is true. Estimation of distance may be accomplished based on a data previously mapped between the RSSI and the distance, and for example, when the RSSI value is a1, the distance is b1 meter, and the RSSI value is a2, the distance is b2 meter, and so on. As such, the distance can be estimated based on previously measured or known mapping data. Meanwhile, distinguishing the devices adjacent to the host device 100 and furthermore estimating the distances between the host device 100 and the adjacent devices by inserting the direct field and the RSSI in the ad packet make it possible to provide each node with differentiated services within a network.

For reference, the ad packet structure of FIG. 3 may be described in order of [UUID; Community identifier; Counting value; Direct field; RSSI] in a command (code) for actually driving software, and for example, may be described like [HWA_SVC; ROOM123; TTL=30; Direct=true; RSSI=-87 dbm]. In addition, for reference, a device receiving the ad packet may participate in chat room ROOM123 provided by the community service called HWA_SVC, and will broadcast the ad packet to external devices after reducing the TTL value by 1. In addition, the device receiving the ad packet has received the ad packet directly from the host device 100, and may be classified as being separated by a distance corresponding to signal sensitivity of -87 dbm.

Meanwhile, in the method and system for providing a community service according to the present invention, clustering based on the RSSI information described above (hereinafter, referred to as RSSI-based clustering) is possible, which limits the range of devices that can participate in a community to a very narrow area on the basis of the RSSI information described above.

Figure 4A:
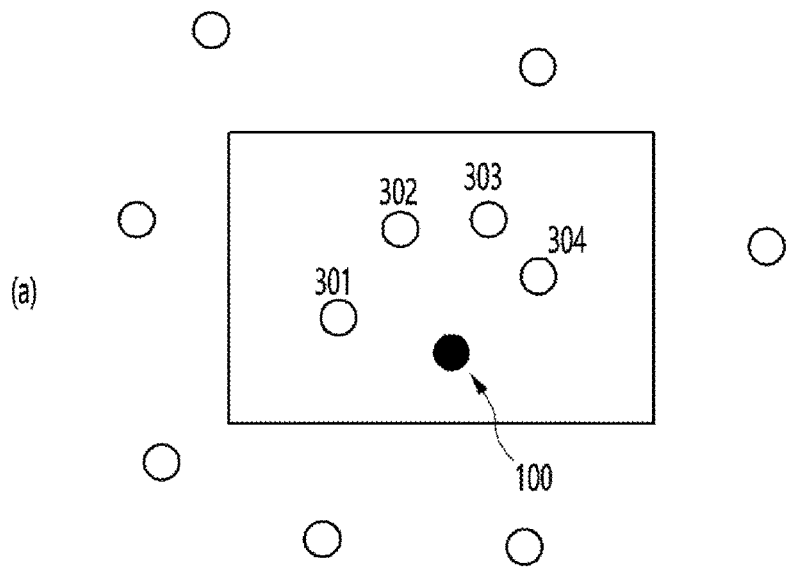
FIG. 4A and FIG. 4B are a view showing a guest clustering function using the RSSI included in an ad packet.
Figure 4B:
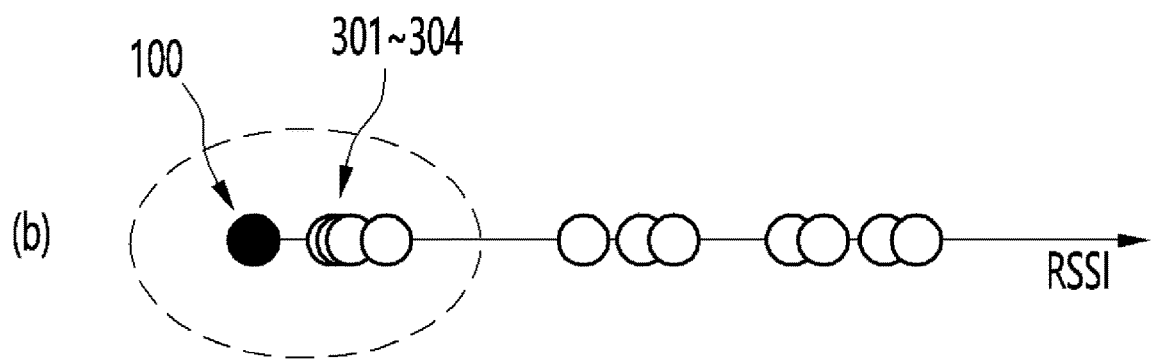

FIG. 4 is a view for describing the RSSI-based clustering. For example, a case of clustering only the users in a meeting room and allowing participation in a community will be described. Generally, a meeting room is separated from an external space by a wall, and due to the presence of the wall, there is a difference between (Bluetooth) signal sensitivity among the devices in the meeting room and signal sensitivity among the devices inside and outside the meeting room. When the difference in the signal sensitivity is used, a cluster of devices 301 to 304 adjacent to the host device 100 can be identified, and these devices can be clustered, and an example implementation of clustering in this way is shown in FIG. 4(b). Referring to FIG. 4(b), when the RSSI values of the guest devices receiving the ad packet from the host device 100 are arranged on the x-axis, a result as shown in FIG. 4(b) can be obtained. At this point, the devices 301 to 304 in the red dotted line are determined as devices estimated to be the closest to the host device 100, and these devices are clustered. Although there may be various algorithms for determining devices that are estimated to be close, the K-means algorithm may be preferably used. The K-means algorithm is an algorithm for grouping given data into k clusters, and operates in a manner of minimizing the variance of difference in the distance between the host device 100 and each cluster. In the service server according to the present invention, a cluster at a close distance from the host device 100 can be distinguished by using the K-means algorithm, and at this point, the service server may use the RSSI value by projecting so that the K-means algorithm may operate effectively.

Meanwhile, in the method and system for providing a community service according to the present invention, preferably, an ad packet may be generated with reference to the structure of an iBeacon packet. Apple's iOS provides a beacon function (iBeacon) at the OS level, and at this point, as a unique UUID may be assigned to a beacon service, when a UUID capable of identifying a service according to the present invention can be loaded on a beacon service packet of an OS company, this may also be used for the host device 100 to effectively propagate a message for inducing participation in a community to the terminals in the neighborhood. More specifically, in this case, when an application for the community service according to the present invention is installed in a device receiving a beacon signal containing an ad packet, the application may be automatically executed in the background of the OS although it is not in an execution state, and the application executed in the background outputs Local Notification on a corresponding device to induce the user to execute the application, and accordingly, the user may be induced to join the corresponding community with reference to the community identifier included in the ad packet. On the other hand, a device receiving the ad packet in the background state may reduce the counting value (TTL) by 1 and broadcast the ad packet to another device according to circumstances, or reduce the counting value (TTL) by 1 and broadcast the ad packet to another device only when the application is executed according to circumstances. For reference, in the case of iBeacon, 24 bits out of 4 bytes of the Major and Minor fields may be allocated to the community identifier (chat room ID), 6 bits may be allocated to the counting value, and 1 bit may be allocated to the direct field as shown in FIG. 3(*b*), and additionally, 1 bit may be used as the ad-hoc field for designation of a temporary group. In addition, for reference, in the case of the Eddystone beacon, 28 bits out of 6 bytes of Instance ID may be allocated to the community identifier, and 4 bits may be used as the counting value (TTL), as shown in FIG. 3(*c*).

On the other hand, when an ad packet is generated with reference to the iBeacon packet structure mentioned above, an environment capable of broadcasting the ad packet using a beacon device 500 released on the market may also be implemented. That is, when the system according to the present invention uses a standard iBeacon packet structure, as a beacon device 500 commercialized on the market is installed at a predetermined place, and the beacon device 500 is allowed to continuously broadcast an ad packet containing a specific community service identifier and a specific community identifier, users around the place may freely participate in a chat room.

Figure 5:
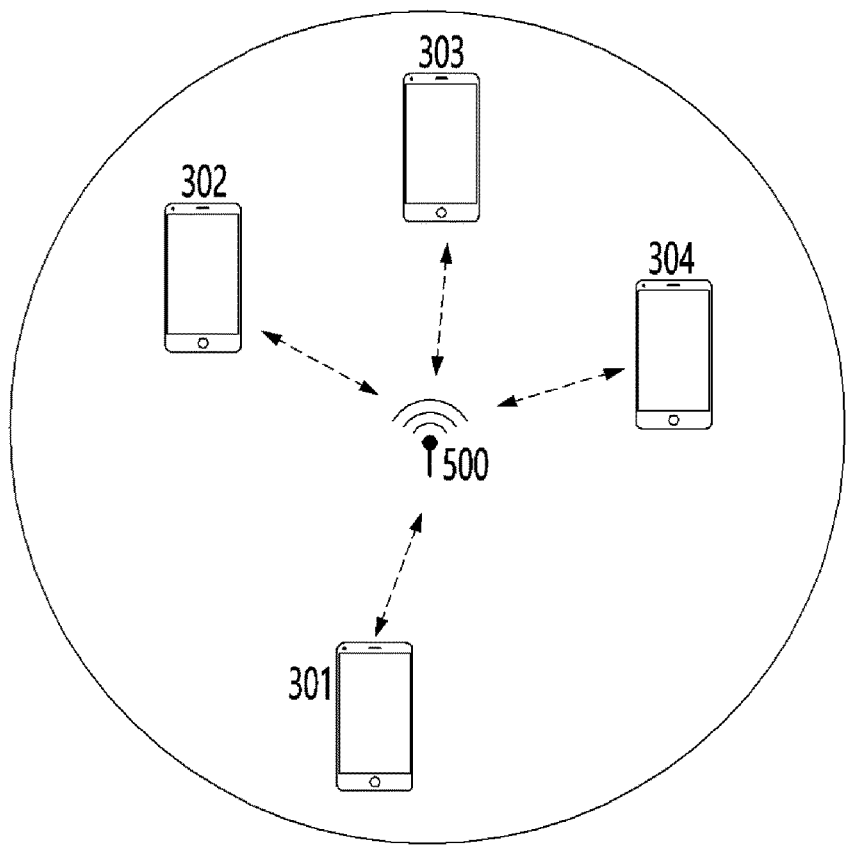
FIG. 5 is a view showing an environment in which a community service is provided by using a beacon device installed in an arbitrary affiliated store.

For example, as a certain business entity establishes in advance a chat room (community) corresponding to a key place (a famous restaurant or store) in a major area for the sake of business or through business so that the chat room may be searched when consumers in the neighborhood execute an application around the place or at the place, it is possible to obtain an effect of accurately specifying the place and participating in the chat room from the consumer's view point, and an effect of utilizing the chat room as a place for marketing or a place for communicating with consumers from the business operator's view point. FIG. 5 exemplarily shows an environment in which a corresponding coffee shop operates a community using the beacon device 500 installed in the coffee shop as described above.

Figure 6:
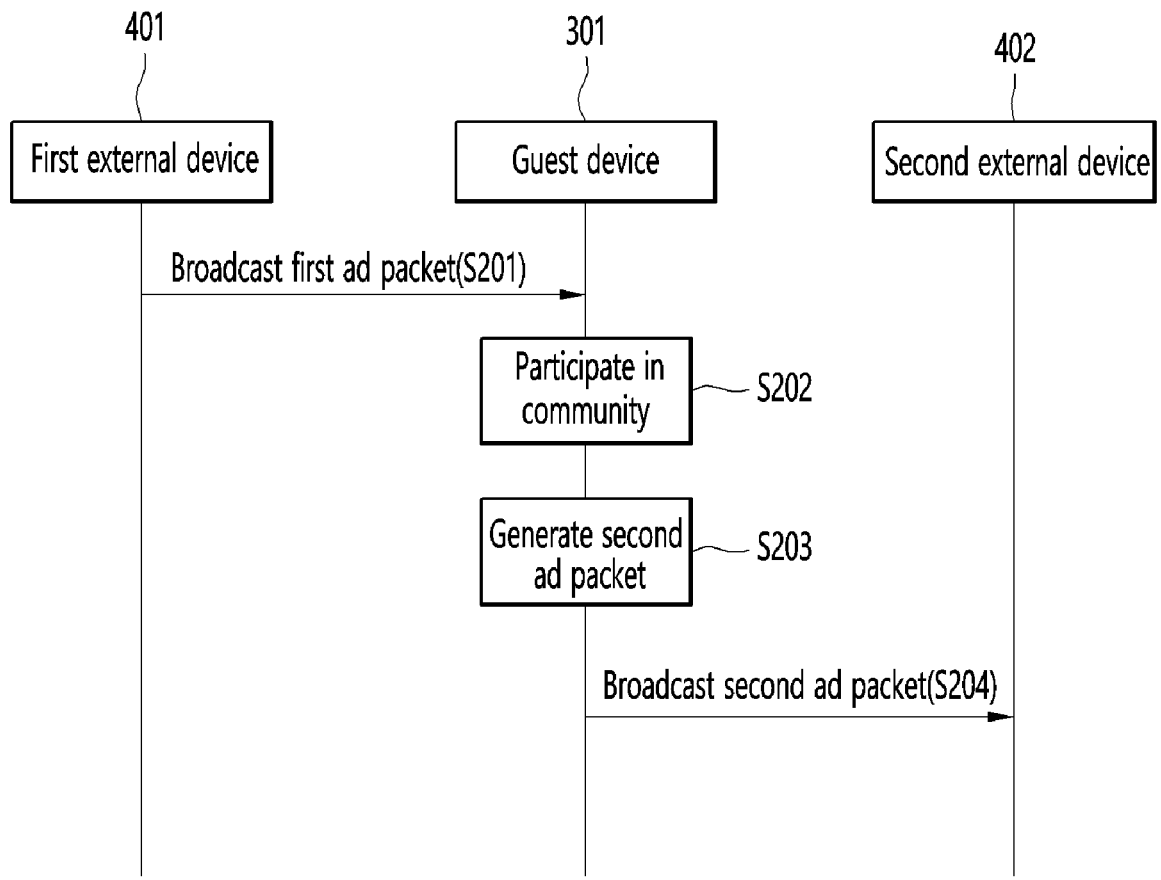
FIG. 6 is a view showing a second embodiment according to the present invention.

FIG. 6 is a view illustrating a community service providing method according to a second embodiment of the present invention, and if the first embodiment relates to ad packet broadcasting of the host device 100, the second embodiment relates to ad packet broadcasting of a guest device receiving the ad packet to another device.

Referring to FIG. 6, the second embodiment may start from a step of receiving a first ad packet, by an arbitrary guest device, from a first external device (S201). Describing this step from another aspect, it may be understood as a step of directing, by an application installed in an arbitrary guest device for the sake of community service, the guest device to receive the first ad packet. At this point, the first external device may be a host device or another guest device.

Meanwhile, the application may direct the guest device receiving the first ad packet to transmit a community participation request to the service server (S202) with reference to the information included in the first ad packet, and participation in the established community may be accomplished depending on approval of the service server. The community participation request may include information included in the first ad packet, particularly, the UUID for identifying a community service, and the community identifier for identifying an established community.

In addition, the application may direct the guest device to generate a second ad packet (S203) and broadcast the generated second ad packet (S204). The second ad packet is generated at step S203 by using some of the information included in the previous first ad packet described above as is and changing some of the information to a different value. For example, the second ad packet may include the same community service identifier (UUID) and community identifier (chat room number) as those of the first ad packet, and set a value obtained by subtracting 1 from the counting value of the first ad packet as a new counting value. In addition, in the second ad packet, the value of the direct field may also be changed from a previous true value to a false value.

Figure 7:
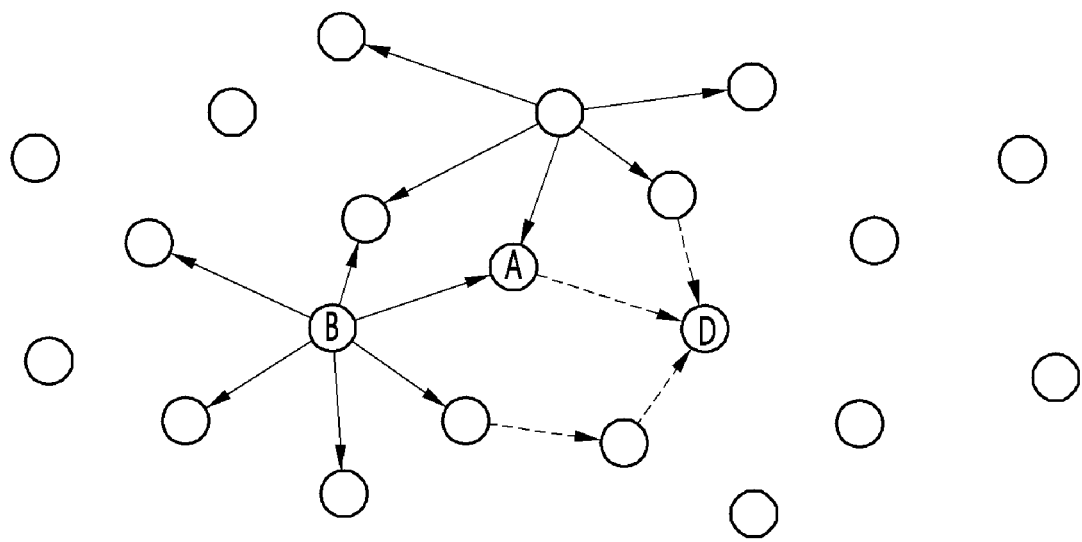
FIG. 7 is a view showing a problem that may occur when a node receives ad packets from several nodes.

On the other hand, in the second embodiment of FIG. 6, that is, on the premise that the process of generating and broadcasting an ad packet by a guest device is understood, when the guest device repeats the second embodiment without any particular restriction, the same problem as shown in FIG. 7 may occur.

Referring to FIG. 7, although arbitrary node A (or guest device A) should be able to receive ad packets from both node B and node C and broadcast the ad packet received from each node to another node, at this point, since node A is unable to broadcast ad packets to other nodes at the same time, it needs to sequentially broadcast the ad packets. On the other hand, in addition to the problems mentioned above, a problem may also occur from the perspective of node D, and since node D is already able to receive ad packets from node B or node C through other paths, it may be said that node D does not need to receive the same ad packet from node A, and rather, another problem may be pointed out in that node A may perform unnecessary broadcasting to node D by unnecessarily using resources.

In the community service providing method according to the present invention, it may be implemented to direct the application installed in each device to execute at least one among the so-called mesh cooldown and mesh duration functions to solve the problems shown in FIG. 7.

Figure 8:
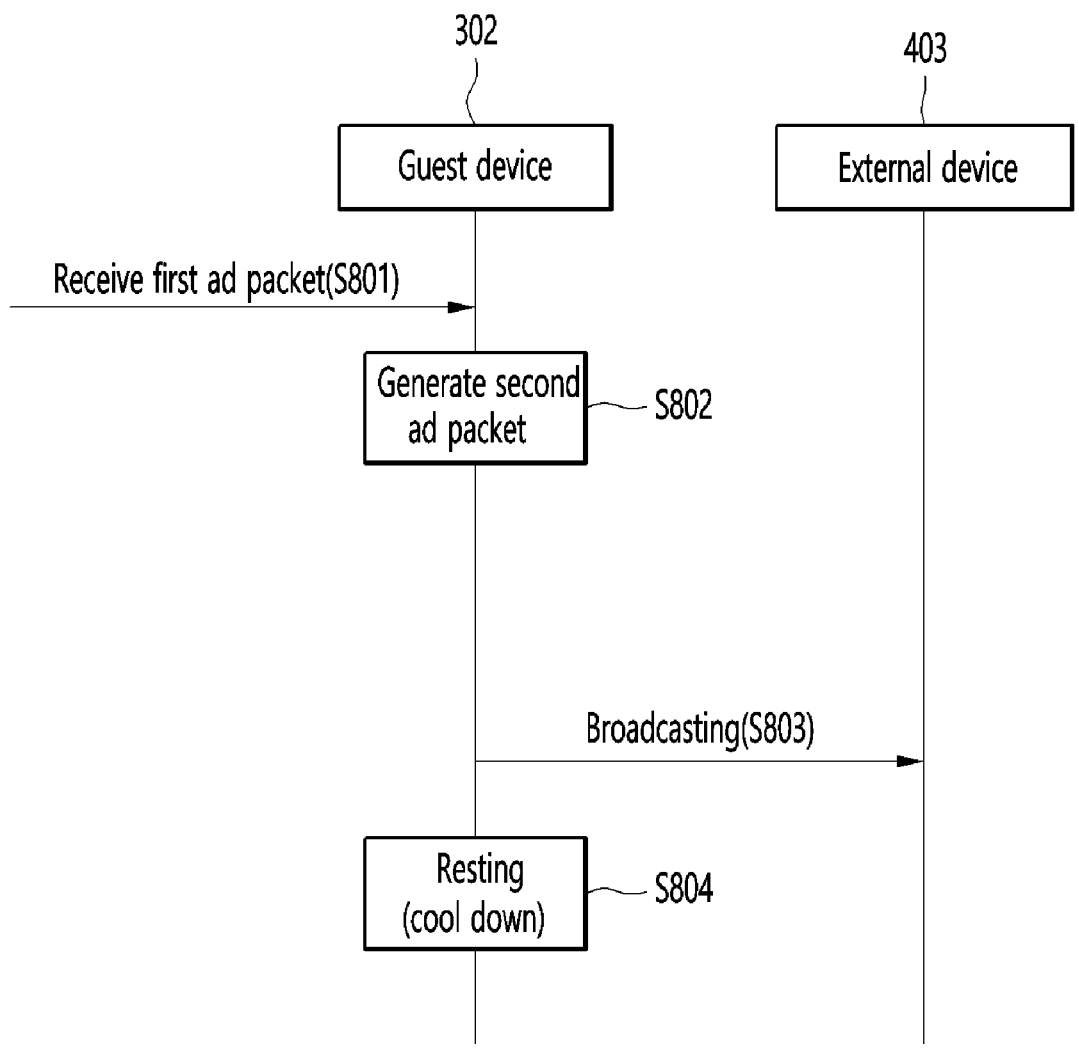
FIG. 8 is a view illustrating a third embodiment according to the present invention.

FIG. 8 is a view illustrating the mesh cooldown function. Referring to FIG. 8, after the step of receiving a first ad packet from the outside (S801), an arbitrary guest device 302 generates a second ad packet (S802), and broadcasts the second ad packet to an arbitrary external device 403 (S803), and after completing a round of generating and broadcasting an ad packet, the guest device 302 may be controlled by itself to have a rest for a predetermined time. Resting at this point may be understood as directing the guest device to stop broadcasting itself or to stop broadcasting of a specific ad packet. The mesh cooldown may be determined each time by a random number, for example, between 20 and 30 seconds, and when the mesh cooldown function is used like this, since node D of FIG. 7 may receive an ad packet from another path while node A is resting, there is an effect of greatly improving the efficiency of broadcasting and receiving ad packets from the aspect of the entire system. In addition, when the mesh cooldown function is used, the guest device 302 may increase the efficiency of utilizing resources, and particularly has an effect of significantly reducing battery consumption.

Figure 9:
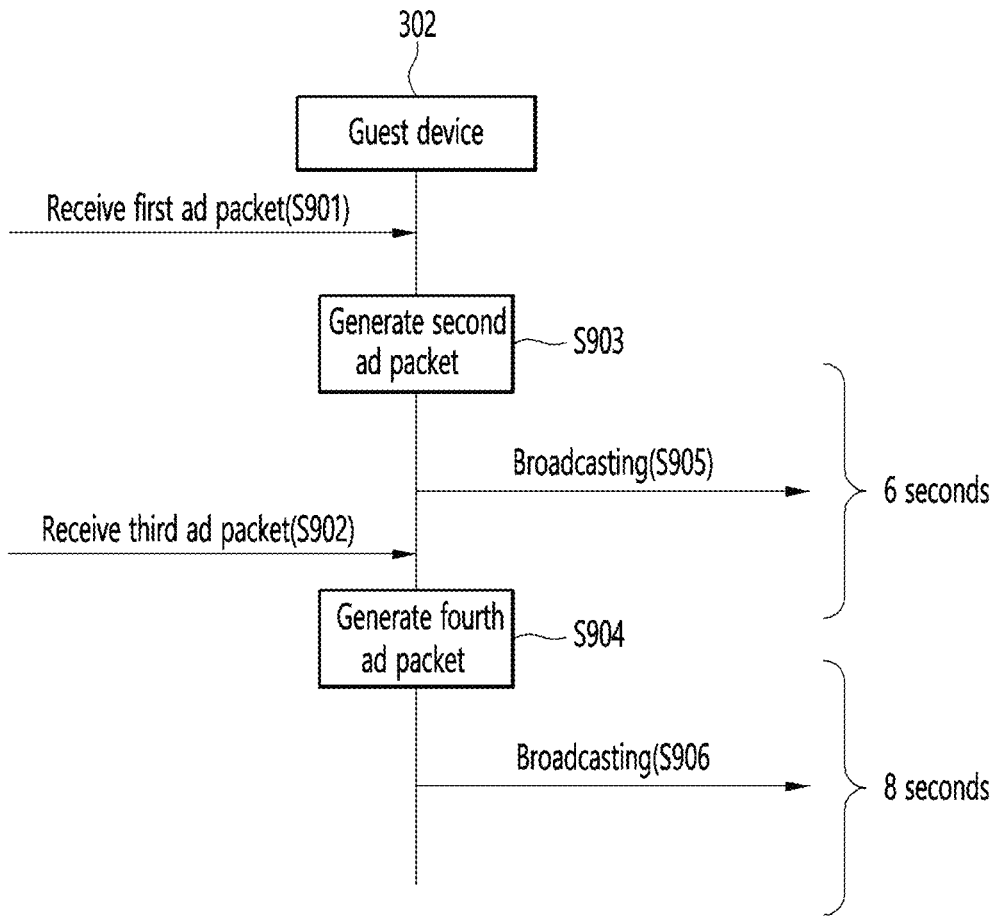
FIG. 9 is a view illustrating a fourth embodiment according to the present invention.

FIG. 9 is a view illustrating the mesh duration function. Referring to FIG. 9, after the step of receiving a first ad packet and a third ad packet from the outside (S901, S902), an arbitrary guest device 302 generates a second ad packet (corresponding to the first ad packet) and a fourth ad packet (corresponding to the third ad packet) (S903, S904), and the generated second ad packet and fourth ad packet are sequentially broadcast (S905, S906). At this point, the time of broadcasting the second ad packet and the fourth ad packet may be randomly determined, and for example, it may be determined as a random number between 5 and 10 seconds whenever each ad packet is broadcast. As a specific embodiment, it may be implemented to broadcast the second ad packet for 6 seconds and the fourth ad packet for 8 seconds as shown in FIG. 9. When the mesh duration function is used, as ad packets are received through various paths from the perspective of node D of FIG. 7, the efficiency of broadcasting and receiving ad packets may be enhanced in the entire system, and at the same time, an effect of efficiently using resources as much may be obtained from the perspective of a broadcasting node.

Figure 10:
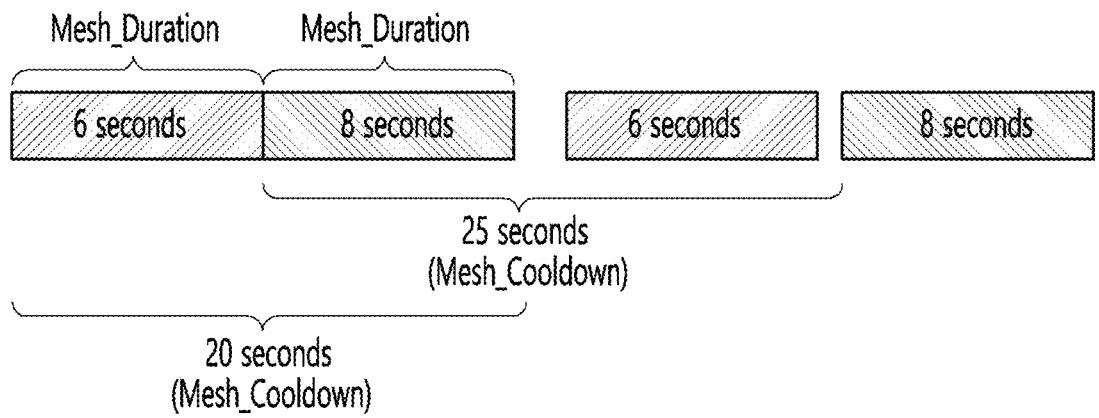
FIG. 10 is a view schematically showing an embodiment simultaneously applying mesh cooldown and mesh duration.

For reference, although the mesh cooldown function and the mesh duration function are separately described in FIGS. 8 and 9, the two functions may be implemented to be executed simultaneously. For example, based on FIG. 9, it may be implemented such that an arbitrary guest device 302 may rest for 20 seconds after the guest device 302 broadcasts the second ad packet for 6 seconds, and thereafter, rest for 25 seconds after broadcasting the fourth ad packet for 8 seconds. FIG. 10 conceptually shows an embodiment in which the mesh cooldown function and the mesh duration function are simultaneously applied, which conceptually shows an example implemented to have node A rest for 20 seconds after broadcasting a new ad packet, which corresponds to an ad packet received from node B, for 6 seconds, and then rest for 25 seconds after broadcasting a new ad packet, which corresponds to an ad packet received from node C, for 8 seconds. In addition, as shown in FIG. 10, the application installed in the guest device may direct the guest device to repeatedly execute the mesh cooldown and mesh duration functions.

Figure 11A:
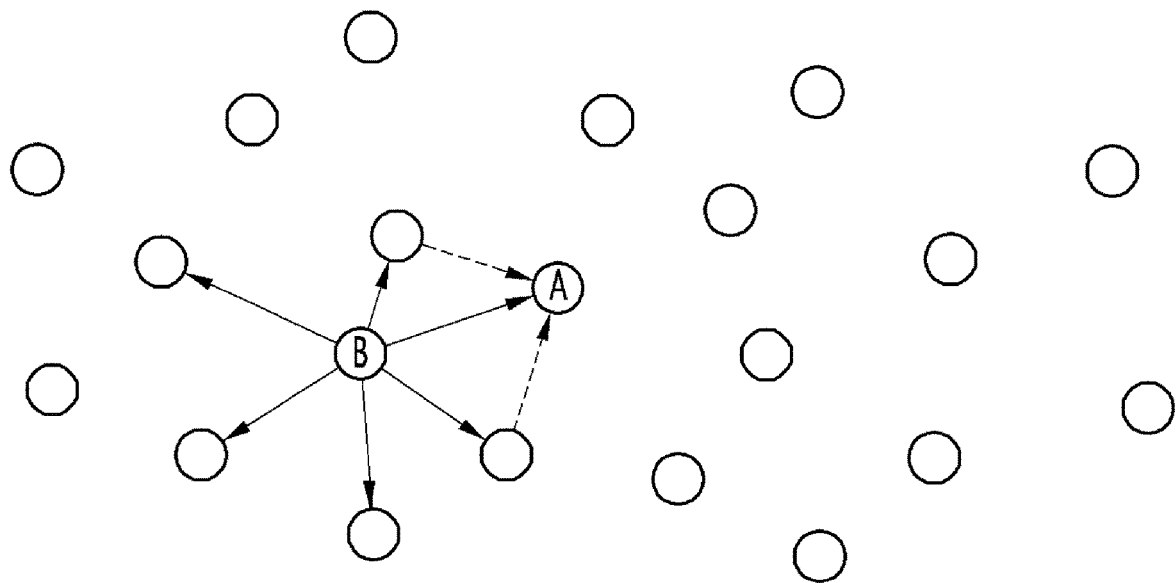
FIG. 11A and FIG. 11B are a view showing a still another embodiment of mesh cooldown.
Figure 11B:
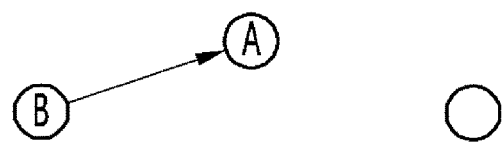

On the other hand, in relation to the mesh cooldown function, the mesh cooldown function implemented according to the present invention may be implemented to adjust the resting time by a specific variable to enhance the effect thereof. FIG. 11 is a view showing the mesh cooldown function, and FIG. 11(a) shows an environment in which a large number of nodes (guest devices) exist in a narrow space, and FIG. 11(b) shows an environment in which a small number of nodes exist in a space. Generally, the mesh cooldown may save resources such as a battery or the like as much as the load required for broadcasting is reduced as the time increases, and at the same time, as the mesh cooldown time increases, the connection time within a mesh network, i.e., the time itself of the guest devices required to be connected to each other within the mesh network by broadcasting, will be reduced as much, an adverse effect of lowering the stability of the mesh network also appears. Therefore, in order to utilize the mesh cooldown function, how to adjust the time may be emerged as an important issue. The present invention proposes a solution to the problem by increasing the mesh cooldown time according to how many ad packets containing the same community identifier are received during the mesh cooldown time, i.e., in proportion to the number of ad packets received to invite to the same chat room. For example, in an environment as shown in FIG. 11(a), node A may receive ad packets derived by node B from several paths, and in this case, since node A does not need to use resources to continuously broadcast the ad packet derived from node B, the mesh cooldown time may be extended. That is, node A may receive an ad packet for encouring participation in the same chat room several times, and since it does not need to broadcast the same ad packet several times to encourage participation in the same chat room, the resting time is extended. On the contrary, in an environment as shown in FIG. 11(b), i.e., in an environment in which nodes are linearly arranged, node A receives an ad packet from node B only through a single path, and since the connectivity and stability of a corresponding mesh network are lowered when node A does not broadcast an ad packet, in this case, stability of the mesh network may be enhanced by directing node A to reduce the mesh cooldown time.

FIG. 12 is a view showing a function of a host device for delegating authority as a host device or authority capable of broadcasting ad packets as a host device to another device.

In the above description of FIG. 2, it has been described that the host device may broadcast an ad packet to arbitrary guest device(s), and particularly, it has been described that in the case of an ad packet directly broadcast from the host device, the direct field has a true value, and at the same time, even the distance between the host device and the guest device receiving the ad packet may be estimated using the RSSI value.

The function shown in FIG. 12 relates to delegation of authority as a host device or authority capable of broadcasting ad packets as a host device.

Figure 12A:
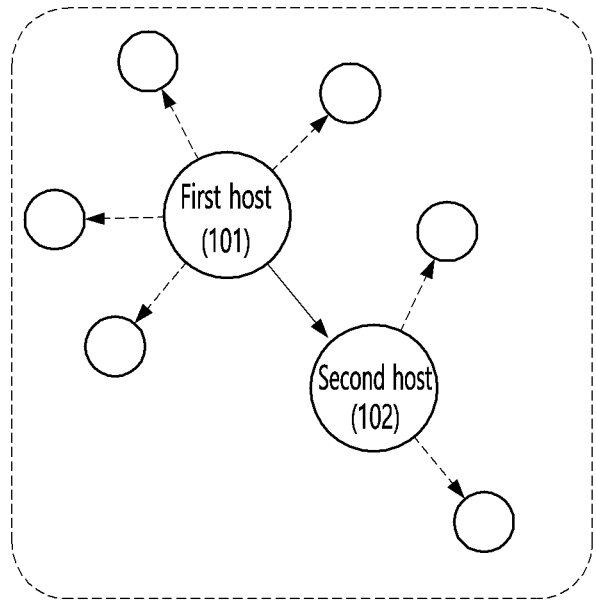
FIG. 12A, FIG. 12B and FIG. 12C are a view showing a function of delegating authority capable of broadcasting ad packets to other devices, by a host device.

FIG. 12(a) show an embodiment in which a specific first host device 101 delegates authority capable of functioning as a host device, i.e., capable of broadcasting ad packets as a host device, to an arbitrary guest device, in an environment in which the first host device 101 can broadcast ad packets to a plurality of guest devices. At this point, the guest device delegated with the authority from the first host device may be defined as a second host device 102 for convenience, and when the second host device 102 is delegated with the authority, although the first host device 101 is in a situation in which broadcasting is no longer possible as the power is turned off due to little remaining battery power or the application is deactivated, the second host device 102 may continuously broadcast ad packets as a host. Meanwhile, the first host device is controlled by an application installed inside thereof, and the user may delegate authority by handling the application (such as a method of touching a button for delegating authority to an acquaintance registered on the application), or the authority may be automatically delegated to another guest device when a specific condition is satisfied (e.g., when the remaining battery is less than 5%, or the like). In addition, the function may further include a step of verifying that the first host device and the second host device are in the same space (a space that can be connected through a Bluetooth mesh network) by allowing the second host device delegated with the authority to confirm delegation of the authority once again.

For reference, the process of delegating authority may be accomplished in a form in which the first host device is controlled by an installed application to transmit a series of data to the second host device, and the transmitted data may include an identifier that can identify a data packet for delegation of host authority, basic information about the first host device, and the like. Meanwhile, the second host device delegated with the authority generates and broadcasts an ad packet, and at this point, the ad packet may include the same identifiers (community service identifier, community identifier) as those of the ad packet broadcast by the first host device, a direct field having a true value, and the like, and the counting value may be set to a value the same as or different from that of the ad packet of the first host device according to circumstances.

Figure 12B:
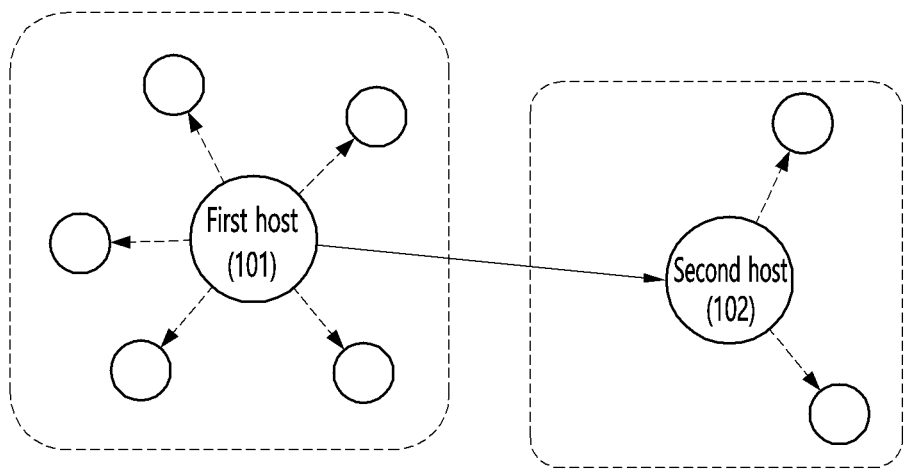

FIG. 12(b) shows an embodiment of delegating authority as a host device or authority capable of broadcasting ad packets as a host device to another device in a different space (a space that cannot to be connected by a Bluetooth mesh network), unlike the previous one.

Although the method of delegating authority is substantially the same as the embodiment described in FIG. 12(a), there is a difference in that the second host device 102 is too far to be connected by a Bluetooth mesh network (accordingly, it is not a guest device that receives broadcast of the first host device), and transmission of data for delegation of authority may be performed through a wide area network such as a mobile communication network or Wi-Fi. When delegation of the host device authority as shown in FIG. 12(b) is performed, there is an effect of broadcasting from a new location to new neighboring nodes, and since there is an effect in that users who are not in the same space may participate in the same community (chat room), particularly, it is also possible to implement a connecting service that enables regional expansion of chat rooms having a specific topic.

Figure 12C:
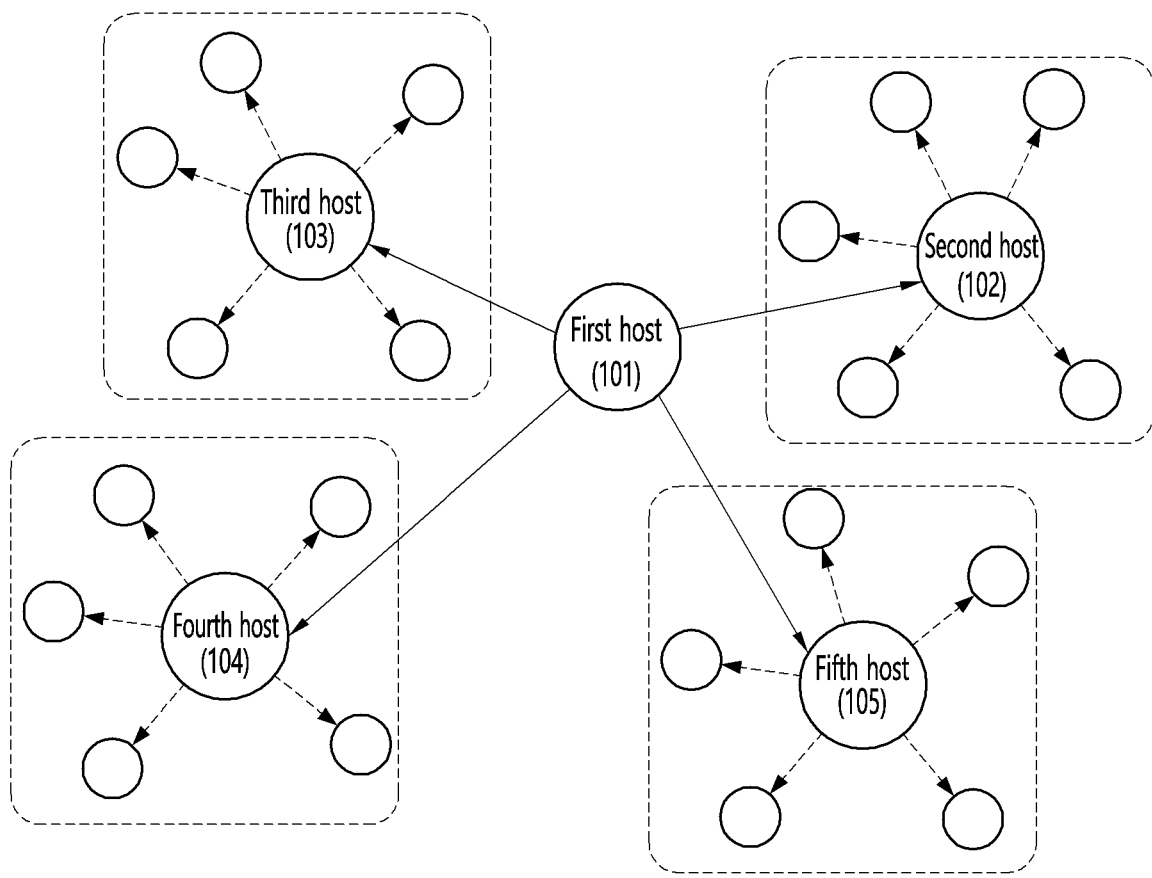

FIG. 12(c) shows an application embodiment of FIG. 12(b) described above, which is implemented to allow the first host device to delegate authority to a counterpart regardless of in which region or place the counterpart to be delegated is, referring to an address book DB (the address book DB may be stored in the first host device, stored in a cloud server, or stored in the service server linked to an application to use the community service). In this process, the counterpart delegated with the authority may be automatically invited to the community (chat room) in which the first host device participates in.

In the application embodiment according to FIG. 12(c), for example, when a user of the first host device 101 selects, on the application, a plurality of counterparts to which the authority will be delegated from the address book DB including his or her acquaintances, all the selected counterparts participate in a specific chat room (a chat room to which the user of the first host device belongs), and each of the devices (102 to 105) delegated with the authority as a host device is defined as a host device so as to broadcast an ad packet based on the point where each device is located. The application embodiment as shown in FIG. 12(c) has an effect of, for example, encouraging acquaintances in several regions to participate in a chat room (community) that is established with a specific subject (theme), and in addition, another effect is expected in that a large-scale chat room may be built by recruiting arbitrary participants centering around the location of each acquaintance. Furthermore, when the application embodiment as shown in FIG. 12(c) is implemented to allow settlement (online settlement) between participants, there is a possibility of invigorating online transactions between participants, and in some cases, even offline transactions may be combined among the participants in the same space.

Figure 13:
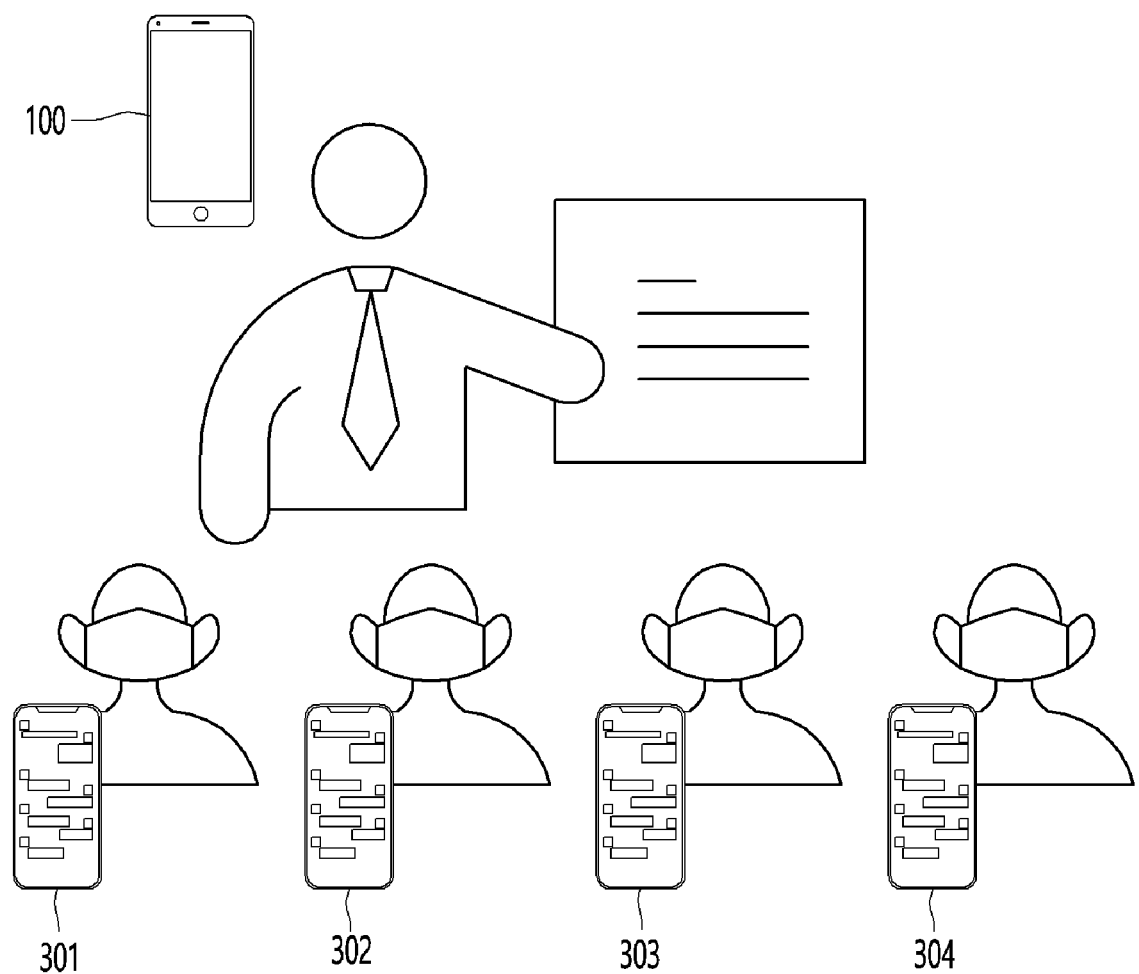
FIG. 13 is a view showing a function of monitoring the use status of guest devices, by a host device.

FIG. 13 is a view showing still another embodiment of a community service providing method according to the present invention, and it is to explain that a host device is implemented to monitor the use status of a plurality of guest devices.

In the above description, it has been described about a feature of a host device inviting participants in a community by broadcasting an ad packet having specific information, and a feature of a host device delegating authority to other devices, and in addition, the host device may be implemented to monitor the use status of guest devices receiving the ad packet transmitted by broadcasting and to directly control each guest device according to circumstances.

FIG. 13 is a view showing an environment in which an instructor's smartphone is connected to students' smartphones as a host device 100 and guest devices 301 to 304 in a university lecture room, and for example, it may be understood as a state in which the instructor has established a chat room (community) for lectures by using his or her smartphone application, and the students in the lecture room have participated in the community by broadcasting. At this point, the application of the host device may further display an interface that can be used by the user (instructor) of the host device, and attendance, lateness, early departure, or the like that can be known through whether the guest devices participate in the chat room, as well as a dialogue window through which the instructor may chat with the students, may be displayed here. In addition, a menu for confirming attendance at a lecture based on what the students have answered through the dialog window may also be displayed. In addition, a menu for evaluating the class attitude and class concentration on a corresponding lecture with reference to whether the students have confirmed reception of a question of the instructor and the time taken to confirm the reception, whether the students have answered the question of the instructor and the time taken to answer the question, or the like may be displayed on the application of the host device. In addition, as the host device is implemented to periodically confirm the connection state between the host device and the guest devices or the resource use status of the guest devices, whether the students do other behaviors (SNS, web surfing, games, video playback, etc.) than the lecture application may confirmed. Furthermore, as the application for community service installed in each guest device is implemented to receive a control command from the host device and control each of the guest devices, it is possible to monitor the use status of the guest devices directly on the host device and control the guest devices to terminate unnecessary applications. In addition, the application of the host device may display spatial, temporal, and social relationships in the lecture room based on monitoring information, and may be implemented to generate and analyze history data based on accumulated monitoring information.

Meanwhile, it is understood that the monitoring function of FIG. 13 is used not only in an offline meeting, such as in a lecture room, and may also be used in a non-contact online meeting.

In addition, this function is expected to be a starting point of a new type living environment, which will be called as Online & Offline (O&O) in the future, i.e., it may be understood as a starting point of a new paradigm that incorporates online community technologies in an offline living environment. Particularly, when there is a risk of spreading an infectious disease and thus a living environment such as social distancing is routinized, there may be limitations that cannot replace all existing offline living environments with online living environments, and when the community service providing method according to the present invention, particularly, the community service providing method of a form as shown in FIG. 13, is utilized, it is expected that a new living environment incorporating an online living environment may be constructed while maintaining the offline living environment. As described above for example, as long as offline institutions such as universities exist, there are many limitations until the lecture room offline education is completely replaced by online education, and eventually, it will return to the lecture room offline education. At this point, an online chat room service, such as the community service according to the present invention, may be applied rather than a method of conversing and discussing face-to-face between an instructor and students. Particularly, the community service according to the present invention may be utilized as a means for replacing or assisting a method of face-to-face communication. That is, students will attend face-to-face lectures in accompany with questions or discussions made in an online method while maintaining the connection state of smartphones in a lecture room, and attendance and class participation state, class concentration state, and the like are automatically monitored and controlled based on the communication connection status between devices, whether or not reception of a conversation is confirmed, a response time to a question and the like, and an evaluation may be made later based on historical data generated on the basis of the monitoring information.

On the other hand, the community service according to the present invention may be used for epidemiological investigations for preventing infectious diseases in a situation in which the infectious diseases are seriously spread, by recording contact history of users when the users are gathered in a space. For example, when a specific person is identified as a patient confirmed as being infected by a disease in a situation where 300 users gather and listen to a lecture or attend a worship service, it may confirm who have stayed close or closer to the specific person. In addition, when the community service according to the present invention is used in a situation in which an infectious disease is seriously spread, social distancing may be efficiently accomplished in a way of allowing offline meetings on condition of providing all kinds of information including history of sending and receiving ad packets between devices, signal sensitivity at the time of sending and receiving ad packets, and information on monitoring the use status in a community. Accordingly, the social distancing may be accomplished in a way of conditionally allowing offline meetings, rather than forcing offline meetings in a way of unconditionally excluding contact of people.

Meanwhile, a real-time audio streaming function may be further included in the community service according to the present invention. The real-time audio streaming function may be understood as a function that can transmit user's voice to many unspecified people around the device, and in practice, it may be implemented in the same way as a walkie-talkie. Specifically, the user's voice may be transmitted to other devices around the device by pressing an audio transmission button, and when a guest device desires voice conversation, it may receive voices from the user by pressing an audio reception button. Particularly, this feature is characterized in that voice communications are possible even though there is no phone number information between each other, and particularly, it is possible to communicate by easily utilizing the real-time audio streaming function when users are separated from each other more than a predetermined distance or wearing a mask in a situation where social distancing is required due to an infectious disease. In addition, even when a user talks in a small voice while wearing a mask and a wireless earphone, it is possible to smoothly communicate with a counterpart, and it is advantageous in that even small sounds may be shared with others.

Hereinafter, an embodiment of a form different from the one described above will be described.

Figure 14:
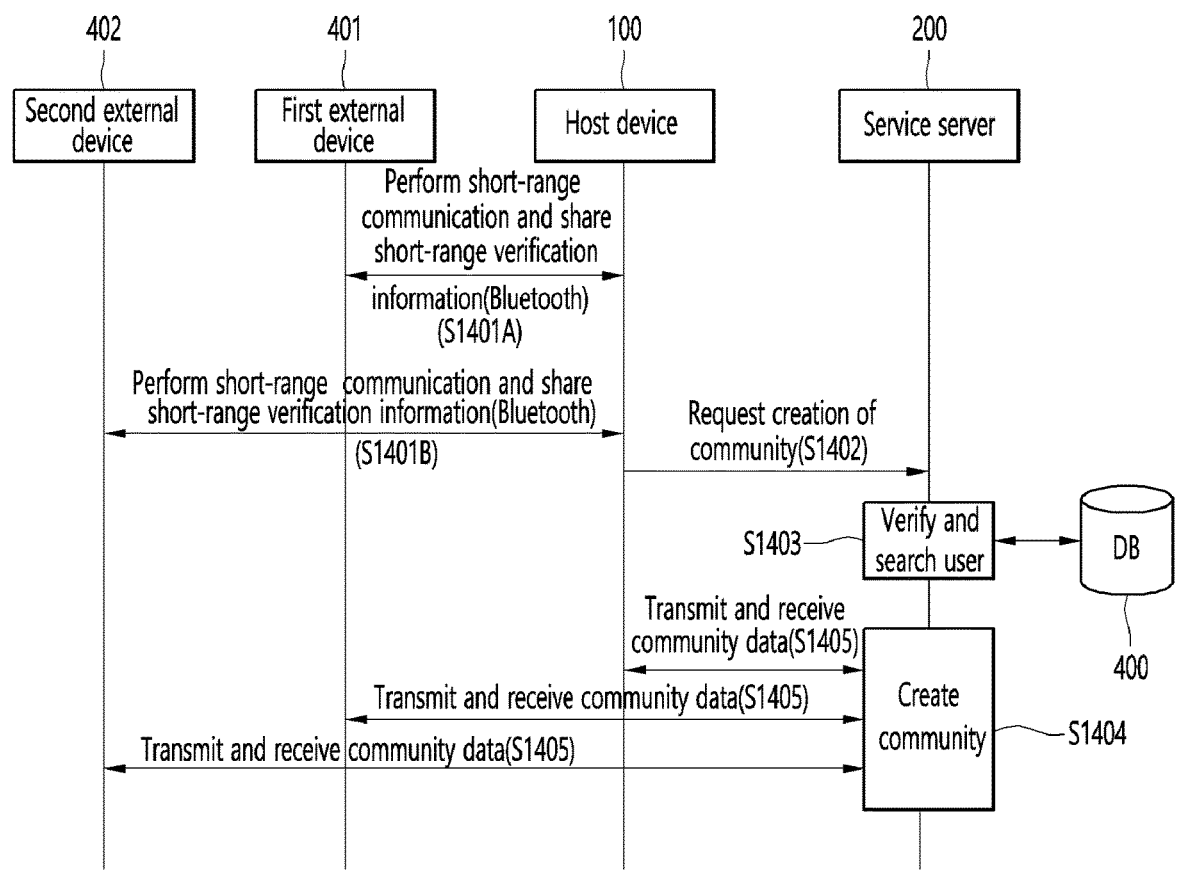
FIG. 14 is a view showing a fifth embodiment according to the present invention.

FIG. 14 is a view showing a fifth embodiment according to the present invention, i.e., how the service server 200 communicates with the host device 100 and a plurality of devices in the neighborhood (a first external device 401 and a second external device 402) to provide a community service.

The fifth embodiment shown in FIG. 14 relates to, in simple terms, a situation in which an arbitrary user has attended an offline meeting and wants to establish an online community with people in the neighborhood by executing an application by himself or herself, and for example, it shows a process of opening a chat room, when an arbitrary user clicks a chat room opening icon of the application, in which many unspecified people in the neighborhood are joined (in this case, the many unspecified people will be users of devices within a range capable of short-range communication).

The fifth embodiment may start from, first of all, a step of performing short-range communication with the first external device in the neighborhood and accordingly sharing short-range verification information by the host device 100 (S1401A), and furthermore, a step of performing short-range communication with the second external device in the neighborhood and sharing short-range verification information by the host device 100 (S1401B) (in this case, the term short-range verification information does not mean information generated according to completion of short-range verification, but information that may be generated as the short-range communication is successful, which means information that is used by the service server 200 in the future to verify existence in a short distance).

The step of performing short-range communication and sharing short-range verification information may be performed through a short-range communication network, more precisely, a Bluetooth network, as described above, and it is a preprocessing step of verifying whether the first external device or the second external device is actually within a short distance from the host device 100, in other words, whether the user of the first external device or the second external device is in a space the same as that of the user of the host device. As long as it is possible to confirm, by the host device 100, whether or not each of the external devices 401 and 402 exists within a short distance, the method of step S1401 will not be limited. However, preferably, it may be configured as a process in which the host device 100 transmits a message (not shown) requesting short-range communication to each of the external devices 401 and 402, and the external devices 401 and 402 receiving the message make a response. As will be described below, the host device 100 may transmit an advertisement message to many unspecified devices and receive a response according thereto, and it should be understood that this is also the same as the method described above. On the other hand, the host device 100 may further collect identification information of each device in the process of attempting short-range communication and the step of sharing short-range verification information. At this point, the identification information of the devices may include a Bluetooth identification number, a user identification number, a device identification number, and the like, and the identification information collected like this may be used to find out who the user of the device is in the future.

After step S1401, the service server 200 may receive the short-range verification information shared by the external devices 401 and 402 before from the host device 100 and may receive, at the same time, a community creation request requesting to create a community from the host device 100 (S1402). This step may be accomplished by, for example, a method of pressing a "Create a new chat room" icon on an application by the user of the host device 100, and at this point, the host device 100 may further provide identification information of the external devices 401 and 402 collected before, together with the community creation request. Meanwhile, although step S1402 in FIG. 14 is shown as a method of requesting short-range verification information and a community creation request from the service server 200 by the host device 100, the step may also be implemented as a method in which the external devices 401 and 402 sharing the short-range verification information after the short-range communication request the service server 200 to allow participation in the community where the host device 100 functions as a host. That is, when the first external device or the second external device has an intention to participate in the chatting after performing short-range communication with the host device 100, the external devices may request to participate in the community established by the host device 100 by providing identification information of each device or user identification information corresponding to each device directly to the service server 200.

Meanwhile, the service server 200 may verify or determine whether each of the external devices actually exists around the host device 100 on the basis of the community creation request and the short-range verification information received from the host device 100, and furthermore, may find out which users should be included in the newly established community, i.e., search for users corresponding to the first external device and the second external device existing around the host device 100, by searching the database 600 (S1403). Identification information of each device and identification information of each user may be stored in the database 600 to match each other, and the service server 200 may determine which users should be joined in the community, i.e., the chat room, with reference to the database 600.

Meanwhile, the service server 200 may create a community, i.e., a chat room, in response to the community creation request of the host device 100, and at this point, it may be a state in which a user (host) corresponding to the host device and users (member 1 and member 2) corresponding to the first external device and the second external device participate in the created chat room. For reference, the host device 100 and the first and second external devices 401 and 402 may access the community created by the service server 200 through, for example, a mobile communication network such as LTE or a wide area network such as Wi-Fi, and this is shown as step S1405 in FIG. 14. That is, after the community is created, each of the devices may use a chatting service through a stable network such as a wide area network, and therefore, data files of a large capacity may be shared, in addition to chatting.

Figure 15:
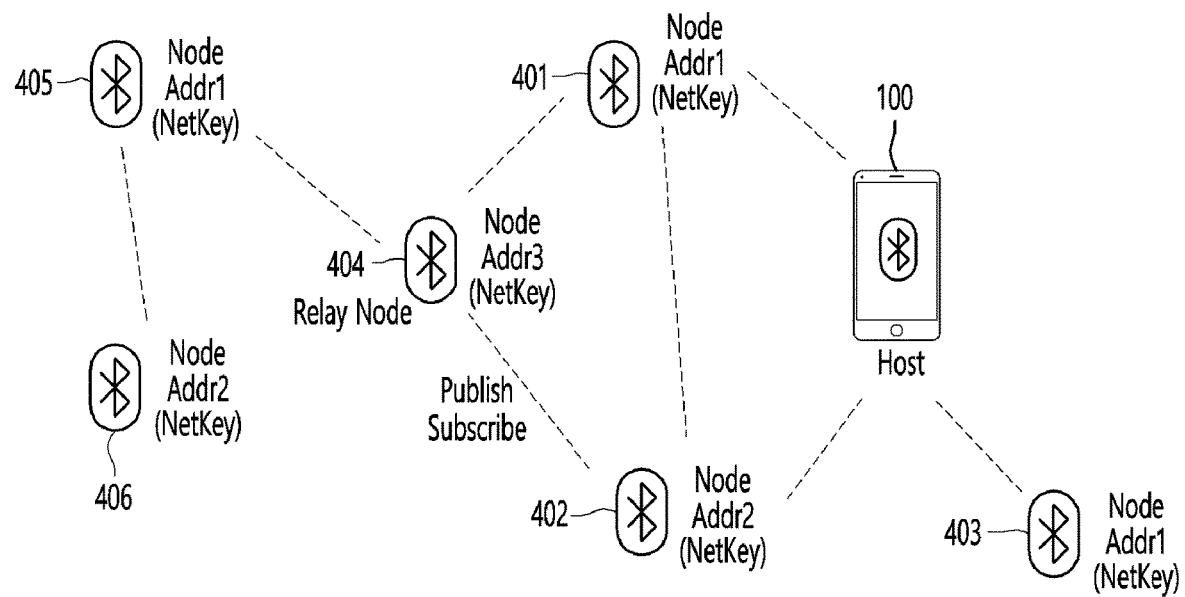
FIG. 15 is a view showing devices connected through short-range communication in a Bluetooth mesh network.

For reference, although it has been described in FIG. 14 as an embodiment in which short-range verification information is shared while the first external device 401 and the second external device 402 are directly connected to the host device 100, since the present invention may use a Bluetooth mesh network as described at the beginning, it may be implemented to share the short-range verification information with devices indirectly connected to the host device 100, as well as the directly connected devices. FIG. 15 shows a view in which the host device 100 is connected to the external devices 401 to 407 through short-range communication in a Bluetooth mesh network, and as shown in the figure, the host device 100 may also be connected to devices not directly connected to the host device 100, such as the fourth external device 404 to the sixth external device 406, through a short-range communication network, and at this point, it is shown that the fourth external device 404 and the fifth external device 405 may function as a node in the network. That is, when the Bluetooth function of the host device 100 is turned on, the host device may transmit a message needed for short-range communication to the devices in the neighborhood, and it may transmit the message while gradually extending the connection distance through an intermediate relay node for the devices at a distance (at this point, it is assumed that the devices are also within the Bluetooth mesh communication network). For reference, at this point, the service server 200 connected to the host device 100 verifies connection of the community while confirming the host identifier and the Bluetooth identifiers of the devices in real-time, i.e., verifies whether each device may participate in the community with reference to the short-range verification information, and this may correspond to step S1402 described above. That is, when members of the devices whose connection state is confirmed click an application of the smartphone, the members are automatically joined in the community, and a screen is displayed on the smartphone to make it possible to confirm the photos and IDs of other connected members in the neighborhood.

Figure 16:
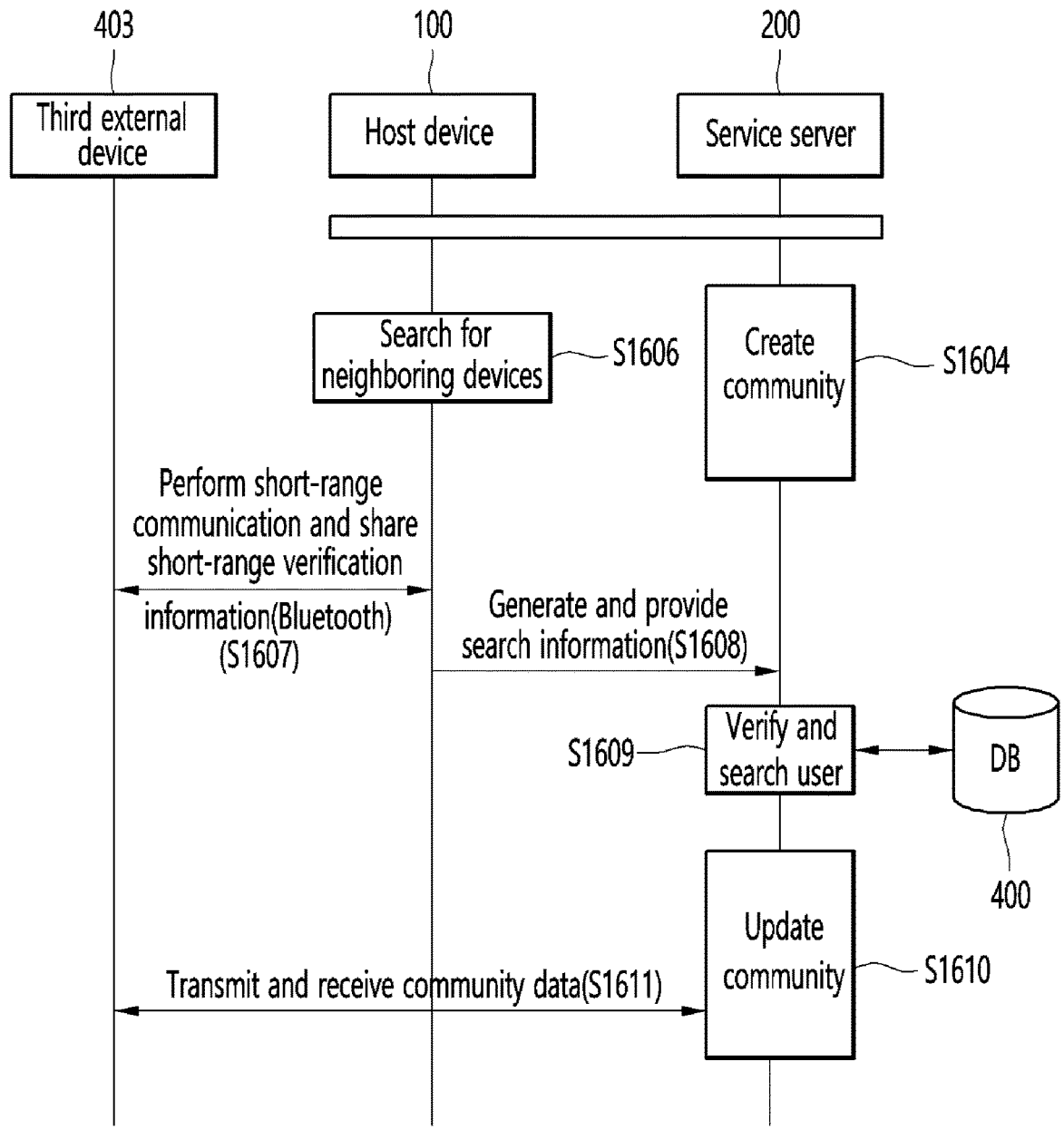
FIG. 16 is a view showing a sixth embodiment according to the present invention.

FIG. 16 is a view showing a sixth embodiment of the present invention, and the sixth embodiment is an embodiment in which the host device 100 periodically searches for other devices within a short distance in a state where a community, i.e., a chat room, has already been created, and notifies, when an arbitrary device is found, the service server 200 of the device to induce the device to join the chat room.

Describing specifically with reference to the figure, the sixth embodiment starts from, first of all, a step of searching for devices in the neighborhood capable of short-range communication (Bluetooth communication) (S1606) on the assumption that a community having a user of the host device 100 as a host has already been created (S1604). Step S1606 may be continuously performed in real-time, or may be performed by turning on the Bluetooth function of the host device 100 at regular intervals. In addition, step S1606 may be performed in a manner in which the host device 100 transmits a message to attempt short-range communication to many unspecified devices in the neighborhood.

Meanwhile, when a specific third external device is found as a result of the search, in other words, when Bluetooth communication with the third external device is successful, the host device 100 may share the short-range verification information with the third external device (S1607), and may generate and provide short-range search information including the shared short-range verification information to the service server 200 (S1608). At this point, the short-range search information may further include identification information for identifying the third external device.

Meanwhile, after receiving the short-range search information from the host device 100, the service server 200 may determine or verify whether the third external device is a device in the neighborhood of the host device 100, and may search for a user corresponding to the third external device by searching the database 600 in the same manner as shown in the fifth embodiment (S1609).

After a user corresponding to the third external device is found, the community may be updated by joining the user in the community, i.e., the chat room (S1610), and from this point, the third external device may perform activities in the community together with service server 200 through a wide area network (S1611).

The sixth embodiment has been described above with reference to FIG. 16.

Figure 17:
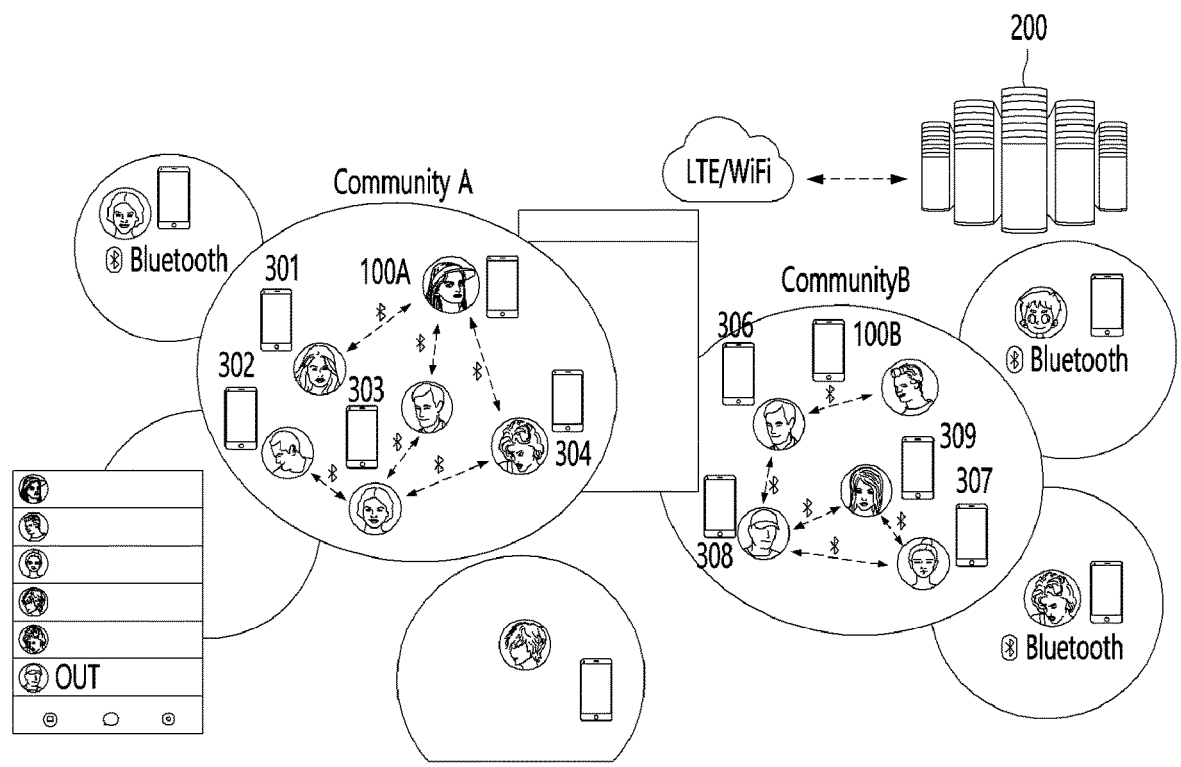
FIG. 17 is a view showing a system actually implementing a community service, a so-called HWA (Here We Are) service, according to the present invention.

FIG. 17 is a view showing a community service implemented according to the present invention.

Referring to FIG. 17, it may be confirmed that a community including other devices existing within a short distance is configured around the host device 100 on the basis of a Bluetooth mesh network. That is, when a user registered in a community service as a member attends a specific offline meeting and drives a smartphone application, existence of other members around the smartphone may be verified through Bluetooth mesh network communication, and the service server 200 recognizes the members and automatically configures a chat room on the basis of the verification like this. In addition, all functions provided online in this chat room will operate at a high quality through a wide area network.

Meanwhile, the service server 200 according to the present invention may manage and maintain a community, i.e., a chat room, in various ways, and hereinafter, some examples will be described.

The service server 200 joins a corresponding user in the community only when it is verified that the device exists in a close location, whereas when a device is once confirmed to belong to a community and then leaves the community, the user who has left the community may still remain in the community. That is, since even a user who goes out of the Bluetooth mesh network and does not exist within a close distance any more is allowed to continuously participate in a corresponding community, continuity of the community can be maintained. However, at this point, the service server 200 may notify other users that the user is out of the area by displaying a mark such as "OUT" in the participant list of the chat room for the user of a device that goes out of the short distance area, and the user may be arranged at the bottom of the user list (the dotted rectangle in FIG. 17). Thereafter, when it is verified that the user's device has entered the Bluetooth mesh network again, the service server 200 may remove the indication "OUT" and place the user at the top of the list.

When the offline meeting is over and all users are out of the area, the service server 200 may still maintain the community. However, when all the users voluntarily leave the community, the community will be perished.

On the other hand, when the size of a created community increases or its functions are diversified while the service server 200 manages the community, it may be implemented to create another community among the users belonging to the community, and furthermore, the community may be created to allow 1:1 interaction. In this case, the users may simultaneously act in several communities in the same manner as the online service, and although the users are spatially out of the area, they may continuously maintain the community activities.

Figure 18:
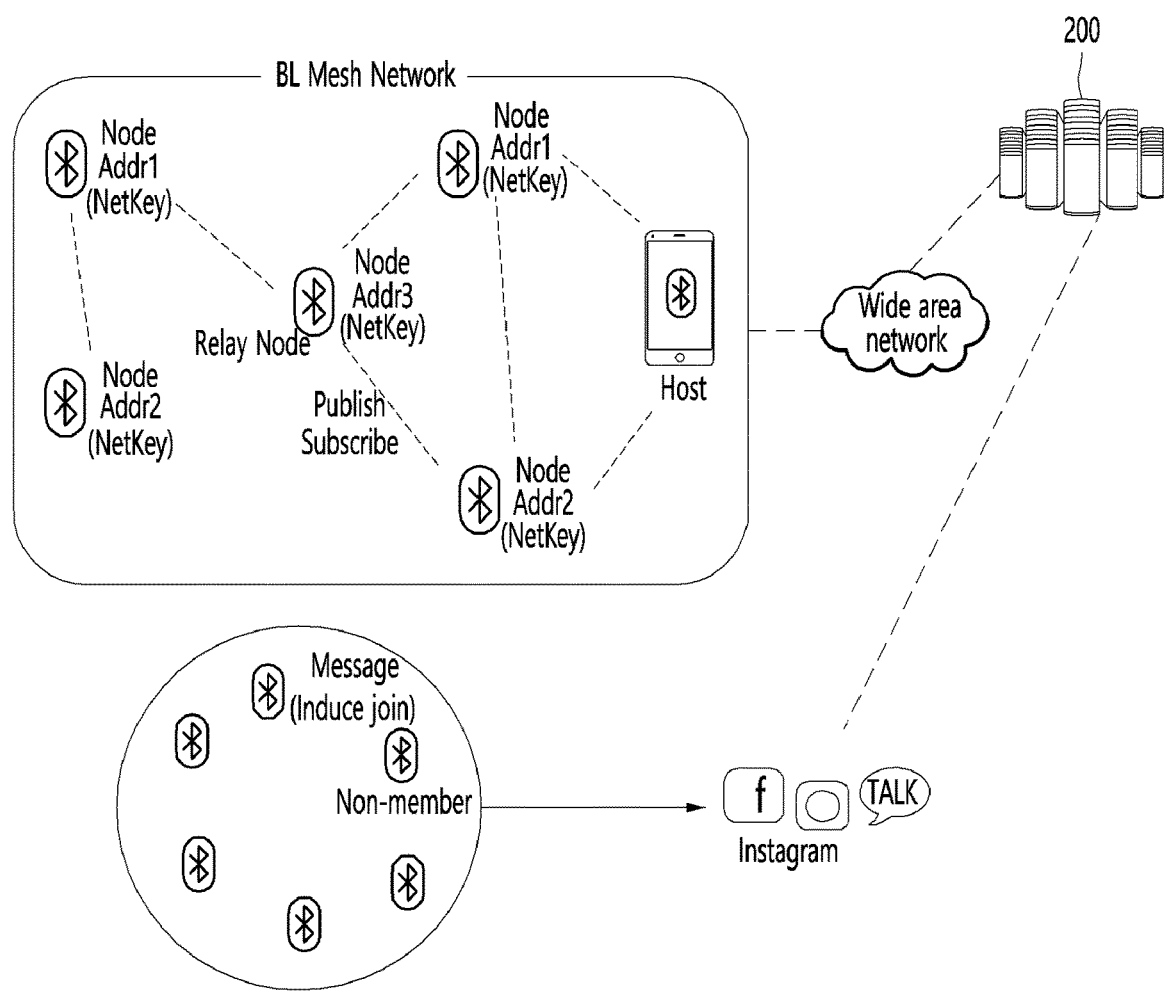
FIG. 18 is a view showing a method of attracting a non-member who is not registered before as a member of a community service.

FIG. 18 is a view showing a process of joining a so-called non-member who is not originally registered in the community service according to the present invention. Referring to the figure, a device of a user who has joined a community as a member (in this case, the device is interpreted as a meaning including a host device or a device in the neighborhood) may transmit a message for inducing to join the community to non-member devices through a Bluetooth mesh network. At this point, the message may include text, an image, a video, or a combination thereof which briefly introduces the service according to the present invention, or may include a URL address for downloading an application. Meanwhile, the device of the non-member who has received the message may join (directly join) as a member through direct access to the service server 200, or may join (indirectly join) as a member by using login information of another SNS service. In the case of direct joining, the non-member may provide his or her personal information and generate new login information at the same time, and then download an application and use the service according to the present invention, whereas in the case of indirect joining, the non-member may input an ID and a password used when the user logs in another SNS service, and then download the application and use the service after going through a series of agreement procedures.

Meanwhile, the service server 200 may perform various functions, in addition to the functions of newly creating a community or verifying proximity of neighboring devices according to a community establishment request from the host device 100, and hereinafter, this will be described through some examples.

Figure 19:
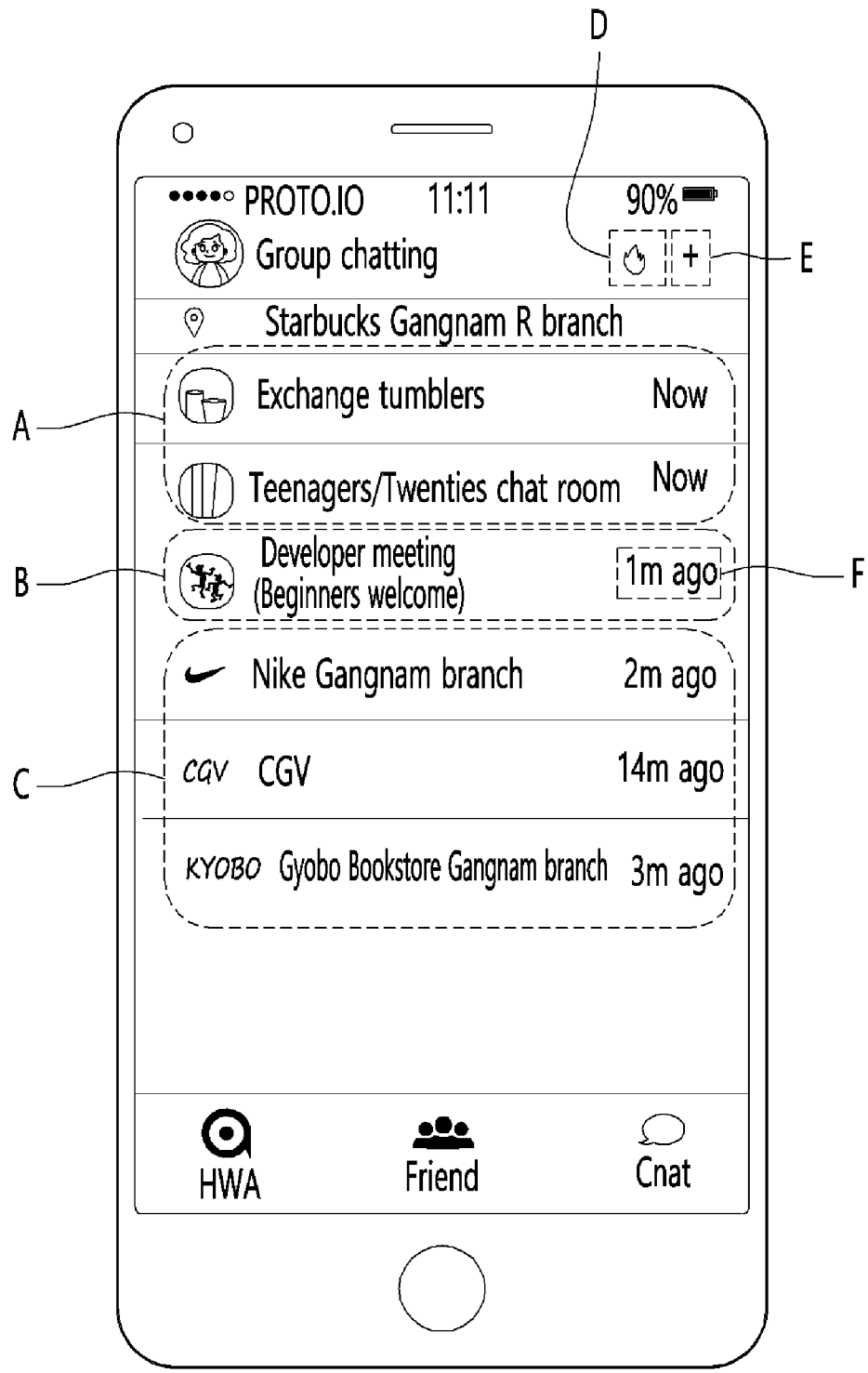
FIG. 19 shows a view of using a community service according to the present invention by a user at an arbitrary place or branch store.

FIG. 19 is a view showing a community (chat room) list displayed when an arbitrary user executes an application, and generally, this may also be understood as a screen that is a starting point of using the application. As is shown in FIG. 19, a user may confirm through the screen which communities are created around the point where the user is currently located and how many users are currently participating in the communities.

Referring to FIG. 19, reference numeral A shows an example in which an arbitrary user executes an application at an arbitrary location, and it is understood from the screen that two communities (A: Exchange tumblers, B: Teenagers/Twenties chat room) are created and activated at the current location. Meanwhile, at this point, the service server 200 may recognize the location of the user through short-range verification information provided by the host device (not shown in the figure), which is connected through a Bluetooth mesh network, to the service server 200 on the basis that short-range communication with the user is possible. In addition, the arbitrary location may be more accurately identified by using a GPS function among the functions of the device itself, and for example, the current location of the user may be determined as cafe A with reference to GPS information. On the other hand, reference numeral B may show communities that the user has participated in the past and is maintained until present. On the other hand, reference numeral C shows a list of commercial communities for a previously generated point of interest (POI), and for example, as an arbitrary business entity establishes a community in advance at a key place (a famous restaurant or store) in a major area for the sake of business or through business so that the commercial communities may be searched when a user executes an application in the neighborhood or at the place, it is possible to obtain an effect of accurately specifying and recognizing a place from the user's view point, and an effect of utilizing the community as a place for marketing from the business operator's view point.

Referring to FIG. 19 again, reference numeral D may be understood as an icon for requesting to display a list of nationwide communities managed by the service server 200 according to a predetermined criterion, for example, in order of communities having the largest number of participants currently, or in order of communities maintained for the longest time. In relation to reference numeral D, it will be described in more detail in the description of FIG. 20.

Figure 20:
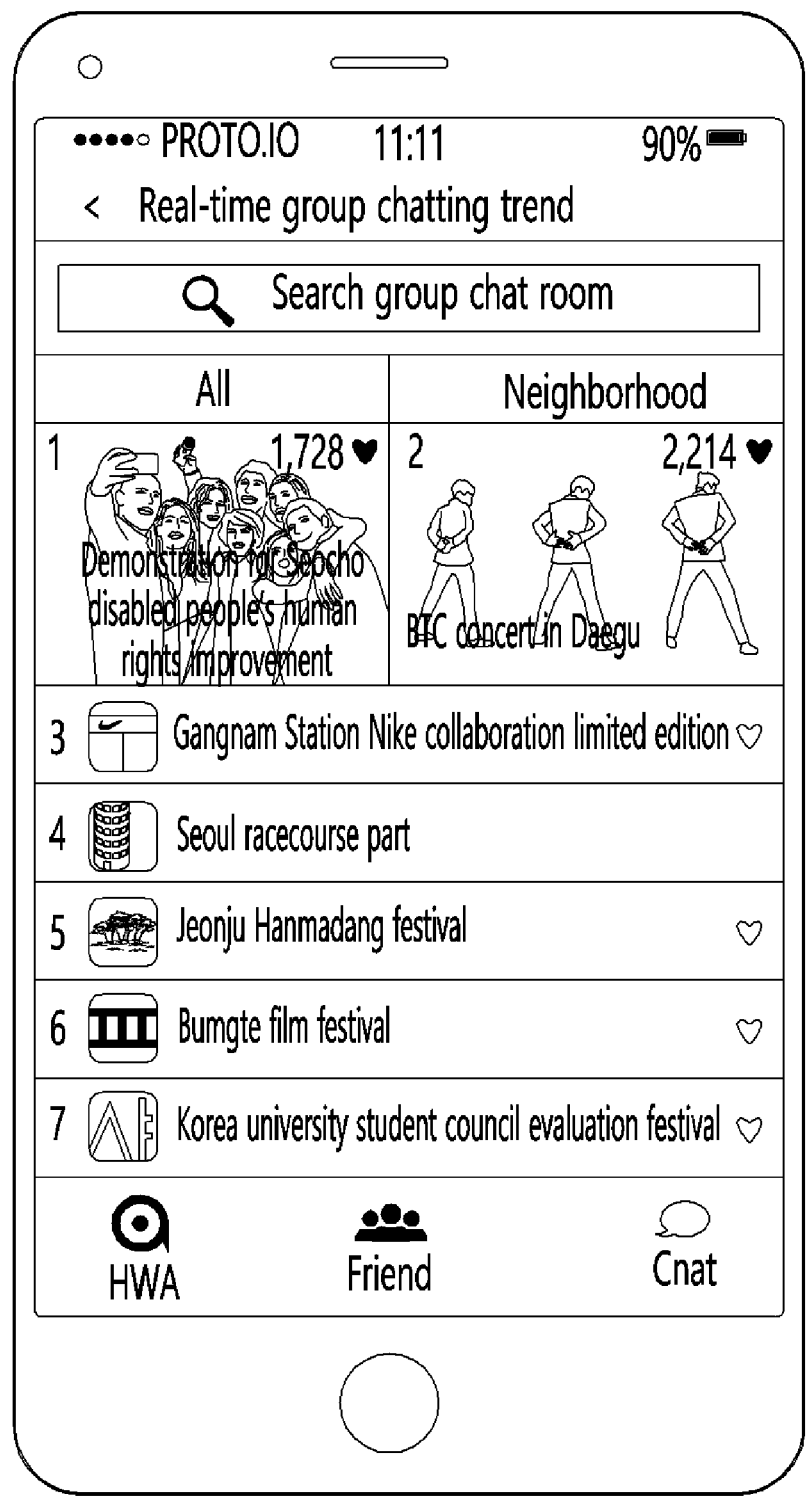
FIG. 20 a view showing a list of communities listed through an application of a device.

Reference numeral E of FIG. 20 is an icon that a user may click to establish a new community at the current location, and the device of the user who has clicked the icon becomes the host device 100 and may create a new community together with devices in the neighborhood. For reference, although not separately shown in FIG. 19, when a user establishes a new community, some arbitrary keywords may be input as hashtags, and this is to allow the user or other users to search for the community in the future on the basis of the keywords. For example, when a certain user has set a keyword #Christmas as a hashtag when the user establishes a new community, the community may be searched by the keyword Christmas described above. On the other hand, from the view point of a general user, when the keyword is input, the user may find a list of communities for which the keyword is set as a hashtag, and monitor the state of a corresponding community by clicking any one desired community from the community list. For reference, the service server 200 may limit the authority of a user accessing the community simply based on a keyword in an online space without authentication through a Bluetooth mesh network like the case as described above, and for example, restrictions such as directly forbidding chatting or disallowing file sharing may be imposed on the user.

Meanwhile, reference numeral F of FIG. 19 is a community creation time point displayed for the user to know when a corresponding community is created.

FIG. 20 is a view showing an embodiment of a screen that is provided when reference number D in FIG. 19 is clicked, in which the service server 200 displays a list of currently created and active communities in order of large number of participants. Preferably, a nationwide community list, not the communities around the point where the user is currently located, may be displayed. That is, since the service server 200 may manage and monitor all active communities, it may provide the user with newly processed information based on collected information and big data, and for example, it may provide information to let the user know in real-time in which community of which region a keyword is most controversial currently, i.e., to know the public interest by the region, by counting the keywords and showing the order. Providing this information may also be helpful for the user to easily grasp public opinions.

Figure 21:
FIG. 21 a view showing an example in which a new friend is added through an application of a device.

FIG. 21 is a view showing a user receiving a friend request from an arbitrary user connected through a Bluetooth mesh network, and the service server 200 may receive a friend request from a user of a device and transfer the request to a user of another device. The friend request function like this may be preferably allowed only between users in a short distance from each other in an offline space, and through the function, a friend may be added online as soon as directly facing the friend in an offline space.

Figure 22:
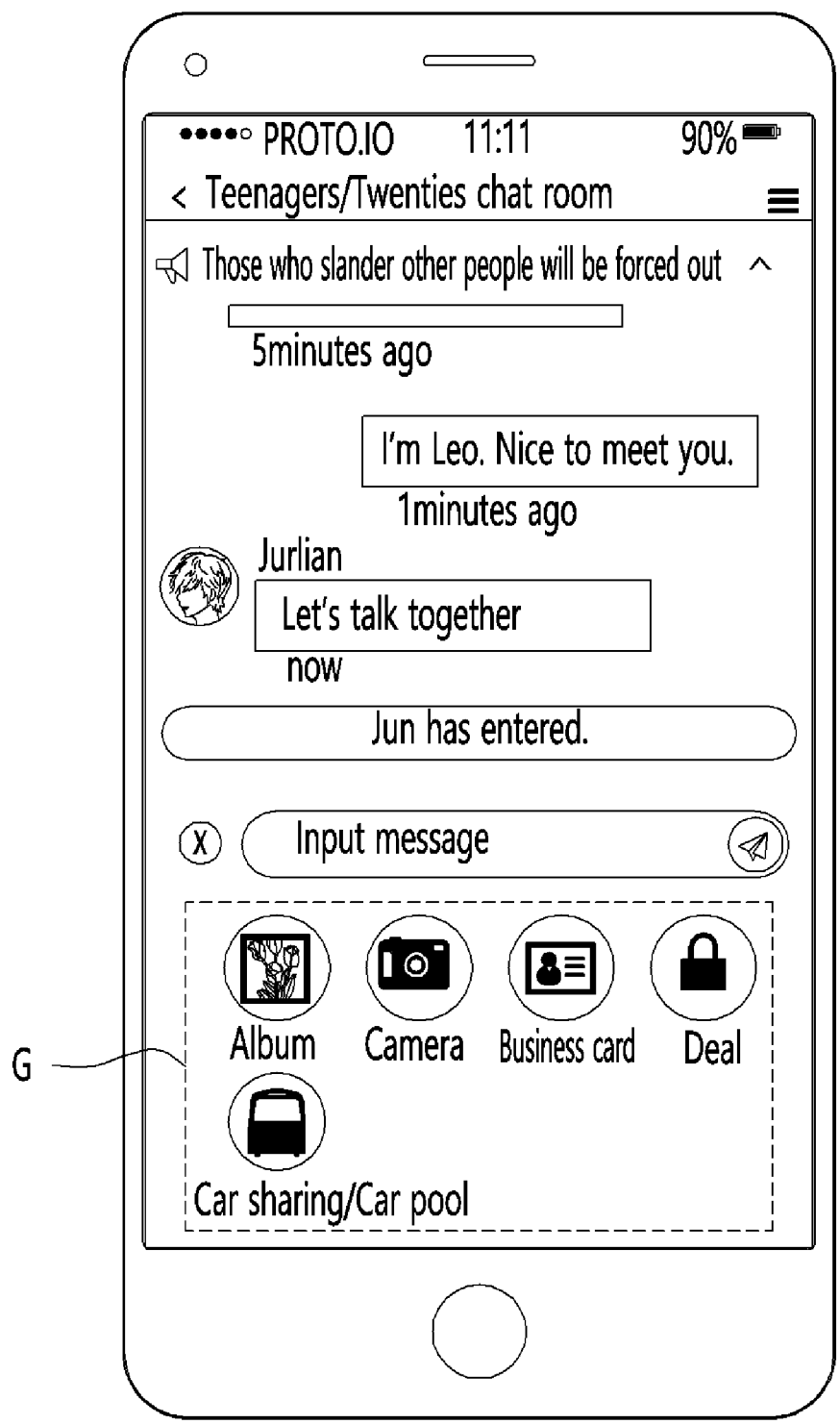
FIG. 22 a view showing that an advertisement may be displayed in an application of a device.

FIG. 22 is a view showing a screen in which chatting is performed in a community, and as a notable matter, icons that may be connected to some independent services are displayed at the bottom of the screen (reference numeral G). That is, a function that can be connected to a separate service such as a business card, a transaction, car sharing/carpool or the like, in addition to the functions needed for chatting (album, camera), may be implemented in the chat room, and although these separate services may be provided by the same subject who provides the services according to the present invention, it is not necessarily limited thereto, and the services may be provided by another contracted business operator.

Hereinafter, cases that may actually utilize the community service according to the present invention will be described.

Figure 23:
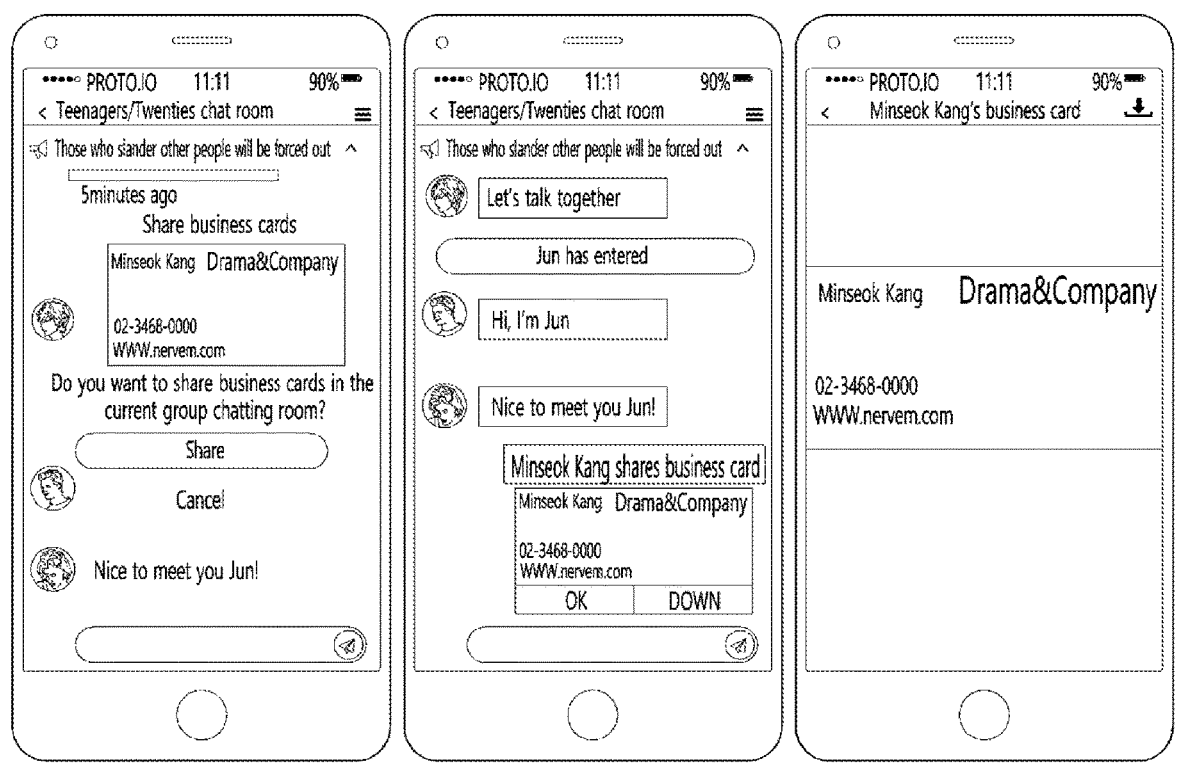
FIG. 23 is a view for introducing particularly a business card service among the application examples of the service according to the present invention.

FIG. 23 is a view showing an application example of providing a business card service together with the community service according to the present invention. According to the application example, a user himself or herself may input his or her business card information in advance when the user joins a community service, and may store an image scanned through, for example, a smartphone camera. At this point, the image may be converted in a standard template and stored in a database. Meanwhile, it may be implemented such that when the user joins a specific community while the business card information is prepared in advance as described above, the user may share his or her business card information with all users in the community with a simple click, and on the contrary, other users may also easily share their business card information. Through the business card service, each user will be relieved from the inconvenience of having to additionally organize business cards in the future. On the other hand, when a user is a member who has not joined the community service or the business card information is not input in advance, the user may receive business card information of other users by participating in the community through a Bluetooth mesh network, and may easily exchange information with each user by sharing his or her business card information later through an input. Particularly, when the user transmits a message for inducing to join a community or inducing to join a community service to a user who he or she meets for the first time in an offline space, the user transmits his or her business card information together, and therefore, information exchange may begin with ease even when the users meet for the first time in the field and there is no connection information at all. Since the conventional introduction process, which begins by exchanging business cards, phone numbers, e-mails, or the like through greetings when the users meet for the first time, may be replaced by only a simple behavior on the spot, there is an effect of greatly increasing convenience from the view point of users.

Figure 24:
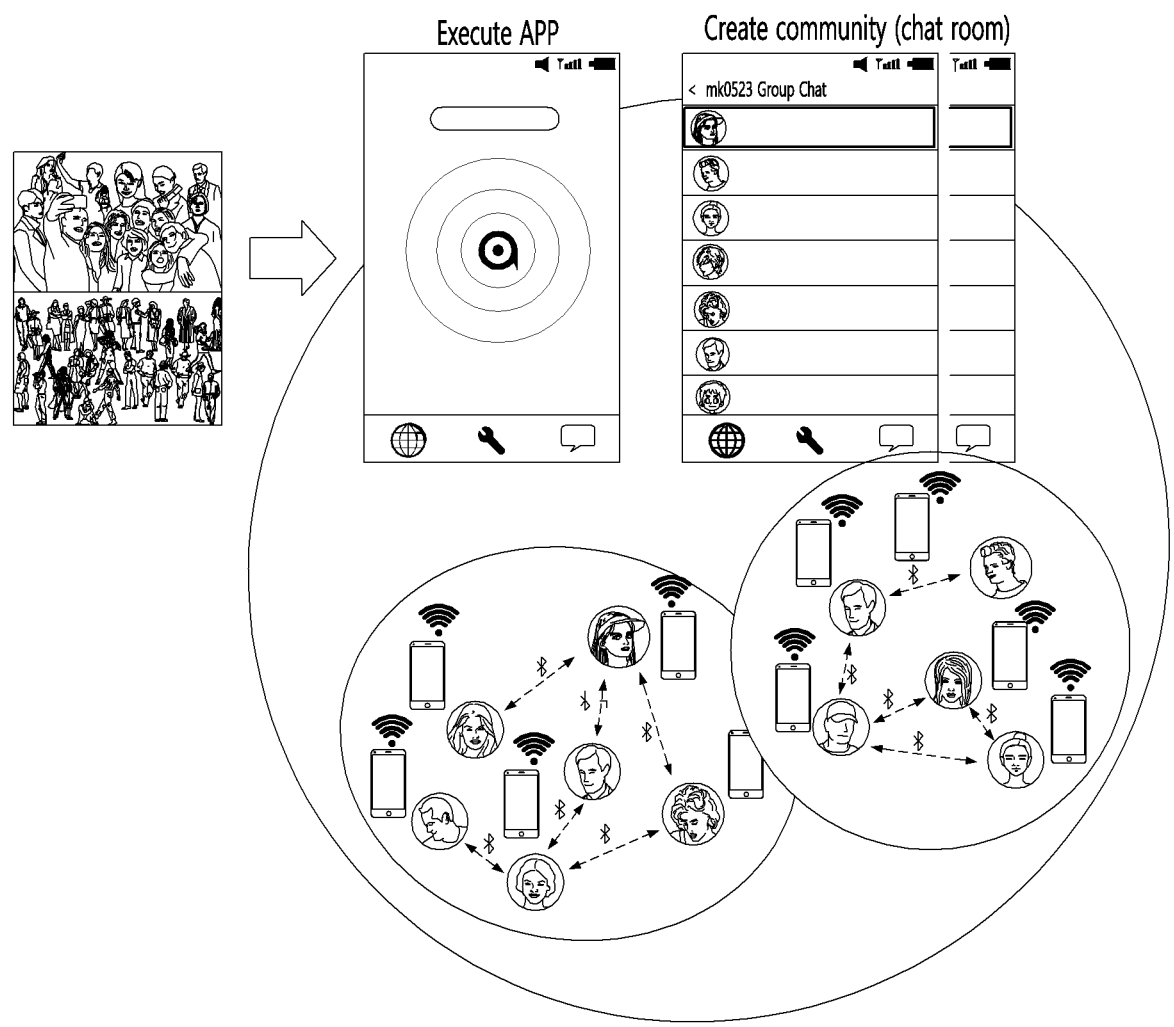
FIG. 24 a view showing an example in which the service according to the present invention is utilized in a public meeting place.

FIG. 24 is a view showing an example of utilizing the community service according to the present invention in a public meeting place. For example, when a user executes an application at an election campaign site and clicks a chat room creation icon, a community (chat room) is automatically created among the members in the neighborhood, and the members may easily make social interactions. In addition, the community continuously connects many unspecified people through a Bluetooth mesh network to form a huge community in an online space. Meanwhile, the community like this still remains even after the meeting is over to form and maintain a huge social network, and may also be used as a means for further strengthening the purpose of the meeting. This is not an online community created by a group that has organized the meeting, but a community created by a user who has gathered the people in the neighborhood, and may be utilized in a variety of ways. This may be used in many public political, social, cultural, educational, sports, and entertainment meeting places, as well as an election campaign site.

Figure 25:
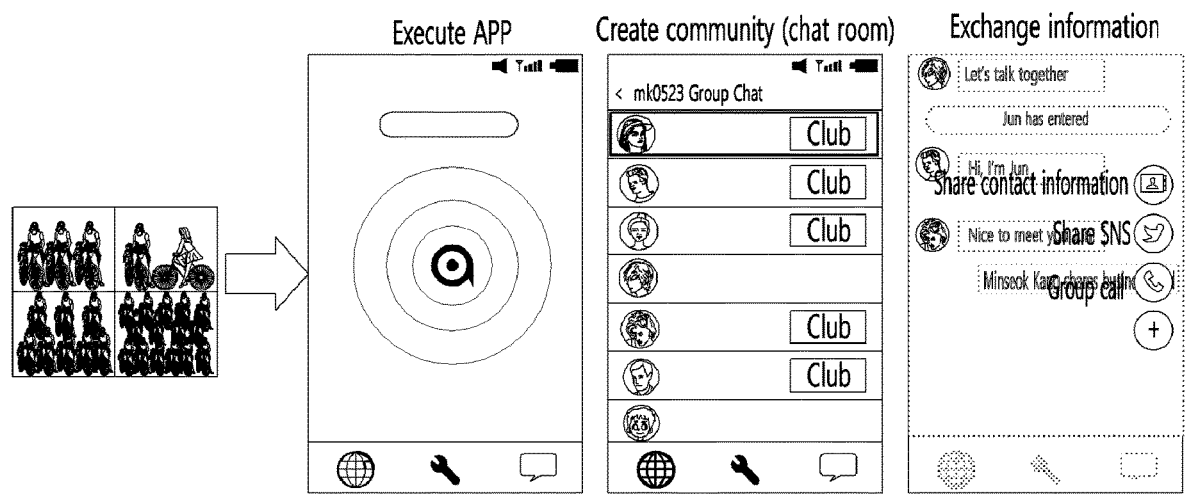
FIG. 25 a view showing an example in which the service according to the present invention is utilized in an offline club meeting.

FIG. 25 is a view showing an example of utilizing the community service according to the present invention in an offline club meeting. For example, the community service according to the present invention may be utilized even when a large number of members in a bicycle club meeting have an instant meeting for a short time in the middle of enjoying bicycle riding. Although they are members of the same club, when there are a large number of members, they actually do not know personally in most cases, and the time to meet each other may be very limited, and when the members who do not know each other have a meeting while having a rest for a moment in the course of riding, they also may need to quickly exchange personal information on the spot. In the case of a sports club like this, there are very few opportunities to exchange information or communicate with each other since they meet several people at a time in a very limited place during a short period of time, and in this case, as a community (chat room) is created with a simple application-driven behavior through the service according to the present invention while the members are gathered close once, and an online community is continuously maintained even after the club meeting is over, communication among the club members can be strengthened.

Figure 26:
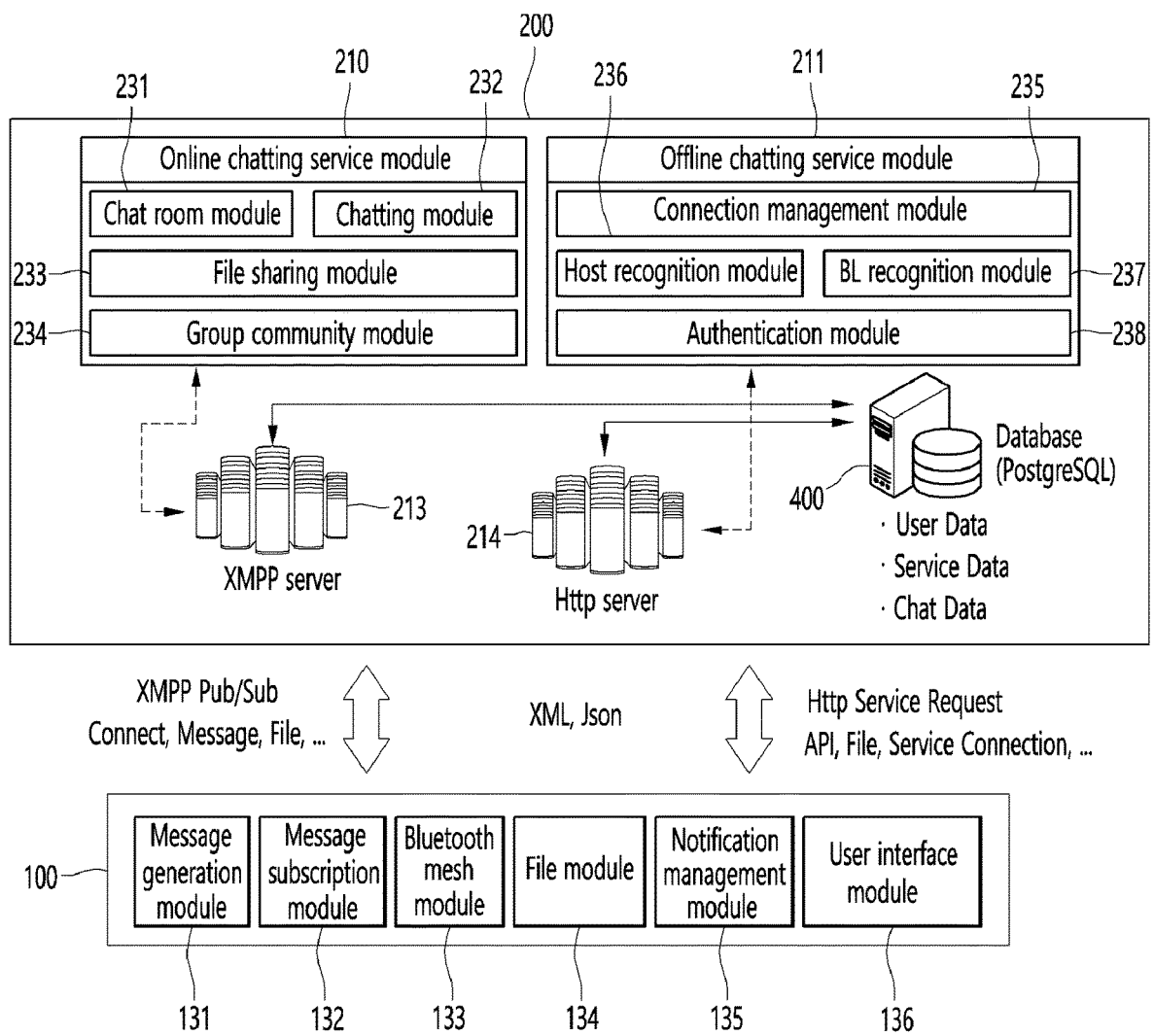
FIG. 26 a view showing the configuration of a service server and a user device mentioned in the present invention.

Meanwhile, FIG. 26 is a view showing components of a system required to execute the various embodiments described above. Referring to FIG. 26, the service server 200 may be largely configured of an online chatting service module 210 and an offline chatting service module 211, and at this point, each service modules may be linked to an XMPP server 213 and an HTTP server 214. The online chatting service module 210 is for providing an online chatting service function that is currently commercialized and provided, and a chat room module 231 and a chatting module 232 may be included therein, and furthermore, a file sharing module 233 that manages sharing of various data or information in the chat room may be further included. In addition, a group community module 234 may be further provided.

Meanwhile, the offline chat module 211 may be understood as a module for managing chat environment provision, short-range verification, and connection status between users for the devices around the host device 100, and a connection management module 235 for managing connection status of users, a host recognition module 236 based on a Bluetooth network, a Bluetooth recognition module 237, and an authentication module 238 for providing a community group in an offline space based on this or authenticating the community group to provide, i.e., verifying a short distance, may be included therein.

The modules described above may operate in real-time on the service server in connection with the database 600 in which user data, service data, chatting data, and the like of a user who has joined as a member are stored.

Meanwhile, describing the device from the functional aspect, an application for using the community service according to the present invention may be driven on the device, and modules for controlling basic chatting messages, such as a message generation module 131 and a message subscription module 132, a Bluetooth mesh module 133 for controlling Bluetooth connection with other devices, and a file module 134, a notification management module 135, and a user interface module 136 in charge of transmission and reception of data or information (files) may be included in a module driven in association with the application.

On the other hand, the service server 200 may be connected to the devices 100 and 300 through various communication protocols such as XMPP, XML, Json, Http and like.

A community service providing method using short-range broadcasting and a system for the same have been described above. Meanwhile, the present invention is not limited to the specific embodiments and application examples described above, and various modified embodiments are possible by those skilled in the art without departing from the gist of the present invention as claimed in the claims. These modified embodiments should not be understood as being distinguished from the technical spirit or prospect of the present invention.

The invention claimed is:

1. A method of allowing a device to execute a community service using short-range broadcasting, the method comprising the steps of:
    allowing the device to transfer a community establishment request to a service server according to an input inputted from a user of the device; allowing the device to receive community information from the service server;
    allowing the device to generate an ad packet with reference to the community information; and
    allowing the device to broadcast the ad packet,
    wherein, the ad packet includes a Universally Unique Identifier (UUID) for identifying the community service, a community identifier for identifying a community established by the service server, and a counting value (TTL) for controlling a range of devices to be allowed to participate in the community, and
    the ad packet further includes a direct field for identifying whether the ad packet is received directly from a host device, wherein the direct field of the ad packet broadcast from the device has a true value.

2. The method according to claim 1, further comprising the step of allowing the device to delegate authority capable of broadcasting ad packets to other devices.

3. A method of allowing a device to execute a community service using short-range broadcasting, the method comprising the steps of:
    allowing the device to receive a first ad packet from a first external device;
    allowing the device to generate a second ad packet with reference to information included in the received first ad packet; and
    allowing the device to broadcast the second ad packet,
    wherein, the first ad packet or the second ad packet includes a Universally Unique Identifier (UUID) for identifying the community service, a community identifier for identifying a community established by the service server, and a counting value (TTL) for controlling a range of devices to be allowed to participate in the community, and
    the first ad packet further includes a direct field for identifying whether or not the device receives the ad packet directly from a host device, wherein when the direct field has a true value, a second ad packet is generated by changing the direct field to a false value.

4. The method according to claim 3, further comprising the step of allowing the device to transmit a community participation request to the service server with reference to the UUID and the community identifier included in the received first ad packet.

5. The method according to claim 3, further comprising, after the step of allowing to broadcast the second ad packet, the step of stopping reception of ad packets from other devices or broadcast of ad packets to other devices for a predetermined time.

6. The method according to claim 3, further comprising, after the step of allowing to receive a first ad packet, the step of allowing reception of ad packets from other devices or broadcast of ad packets to other devices for a predetermined time.

\* \* \* \* \*